United States Patent
Mizumi et al.

(10) Patent No.: US 12,372,386 B2
(45) Date of Patent: Jul. 29, 2025

(54) FLUID SENSOR SYSTEM, COMPUTING DEVICE, AND FLOW DIRECTION ESTIMATION METHOD

(71) Applicants: MITSUBISHI HEAVY INDUSTRIES, LTD., Tokyo (JP); Tokyo University of Science Foundation, Tokyo (JP)

(72) Inventors: Shunsuke Mizumi, Tokyo (JP); Naoto Omura, Tokyo (JP); Masahiro Motosuke, Tokyo (JP); Daiki Shiraishi, Tokyo (JP); Koichi Murakami, Tokyo (JP)

(73) Assignees: MITSUBISHI HEAVY INDUSTRIES, LTD., Tokyo (JP); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 289 days.

(21) Appl. No.: 18/115,525

(22) Filed: Feb. 28, 2023

(65) Prior Publication Data
US 2023/0288238 A1    Sep. 14, 2023

(30) Foreign Application Priority Data
Mar. 11, 2022  (JP) .................................. 2022-038594

(51) Int. Cl.
    *G01F 1/684*   (2006.01)
    *G01F 1/688*   (2006.01)

(52) U.S. Cl.
    CPC .......... *G01F 1/6842* (2013.01); *G01F 1/6888* (2013.01)

(58) Field of Classification Search
    CPC ... G01P 13/006; G01P 13/02; G01F 1/68–699
    See application file for complete search history.

(56) References Cited

U.S. PATENT DOCUMENTS 6,631,638 B2 * 10/2003  James ..................... G01P 13/02
                                                          73/204.26
2020/0284633 A1   9/2020  Akiyama et al.

FOREIGN PATENT DOCUMENTS

| JP | H05180860 A | * | 7/1993 |
| JP | 2020-143903 A | | 9/2020 |

* cited by examiner

*Primary Examiner* — Justin N Olamit
(74) *Attorney, Agent, or Firm* — Birch, Stewart, Kolasch & Birch, LLP

(57) ABSTRACT

The sensor of a fluid sensor system includes an outer peripheral sensor unit including three or more sensor pairs to surround and sandwich the heating element. The computing device of the system includes a first identification unit identifies a sensor pair in which an output difference between an output value corresponding to a temperature detected by one temperature sensor of the sensor pair and an output value corresponding to a temperature detected by the other temperature sensor of the sensor pair is largest, a second identification unit identifies other sensor pairs adjacent to the identified sensor pair in the circumferential direction, and a flow direction estimation unit estimates the flow direction of the fluid on the basis of the output difference in the sensor pair having the largest output difference and output differences in the other sensor pairs adjacent to the sensor pair in the circumferential direction.

7 Claims, 12 Drawing Sheets

FLUID SENSOR SYSTEM, COMPUTING DEVICE, AND FLOW DIRECTION ESTIMATION METHOD

TECHNICAL FIELD

The present disclosure relates to a fluid sensor system, a computing device, and a flow direction estimation method. Priority is claimed on Japanese Patent Application No. 2022-038594, filed Mar. 11, 2022, the content of which is incorporated herein by reference.

RELATED ART

Various methods are used to observe and measure the flow of a fluid. For example, when the flow of a fluid inside of a device such as a steam turbine or a gas turbine is measured in real time during the operation of the device, the installation location of a measurement device is limited. Examples of fluid sensors applicable for the above-described purposes include a heating element and a pair of temperature sensors configured to sandwich the heating element and arranged opposite each other. In this fluid sensor, a temperature difference corresponding to the flow of the fluid occurs between an upstream side and a downstream side of the heating element according to the flow of the fluid serving as a detection target. By detecting this temperature difference with a plurality of temperature sensors, the flow of the fluid is detected.

When the direction of the flow of the fluid and the direction in which the pair of temperature sensors configured to sandwich the heating element and arranged opposite each other are opposite each other are misaligned in such a fluid sensor, the flow detection accuracy decreases. On the other hand, in, for example, Patent Literature 1, a fluid sensor configured to include a primary heating resistor, a pair of X-axis temperature sensors, a pair of Y-axis temperature sensors, and a secondary heating resistor connected to the primary heating resistor and arranged between the X-axis temperature sensor and the Y-axis temperature sensor is disclosed. In the fluid sensor having such a configuration, a plurality of pairs of temperature sensors are provided around the primary heating resistor and therefore the direction of a flow of a fluid is detected with higher accuracy.

CITATION LIST

Patent Literature

[Patent Literature 1]
Japanese Unexamined Patent Application, First Publication No. 2020-143903

SUMMARY

However, in the configuration described in Patent Literature 1, a plurality of secondary heating resistors are arranged around the main heating resistor. Thus, the configuration of the fluid sensor becomes complicated. Furthermore, a process for estimating a direction of a flow of a fluid from a result of detecting a temperature difference after a temperature difference corresponding to the direction of the flow of the fluid due to heat generated by the primary heating resistor and the secondary heating resistor is detected with a plurality of pairs of temperature sensors also becomes complicated.

The present disclosure has been made to solve the above problems and an objective thereof is to provide a fluid sensor system, a computing device, and a flow direction estimation method capable of easily and accurately detecting a direction of a flow of a fluid even in the case of installation in a limited installation space.

According to the present disclosure for solving the above-described problems, there is provided a fluid sensor system including: a sensor arranged on a flow path forming surface that forms a flow path of a fluid; and a computing device configured to estimate a flow direction of the fluid in the flow path on the basis of an output from the sensor, wherein the sensor includes a heating element arranged on the flow path forming surface and configured to generate heat according to electric power supplied from an external power supply; and an outer peripheral sensor unit including three or more sensor pairs provided at intervals in a circumferential direction to surround the heating element, the sensor pair including two temperature sensors configured to sandwich the heating element and arranged opposite each other, and wherein the computing device includes a first identification unit configured to identify a sensor pair in which an output difference between an output value corresponding to a temperature detected by one temperature sensor of the sensor pair and an output value corresponding to a temperature detected by the other temperature sensor of the sensor pair is largest among the three or more sensor pairs; a second identification unit configured to identify other sensor pairs adjacent to the identified sensor pair in the circumferential direction; and a flow direction estimation unit configured to estimate the flow direction of the fluid on the basis of the output difference in the sensor pair having the largest output difference and output differences in the other sensor pairs adjacent to the sensor pair in the circumferential direction.

According to the present disclosure, there is provided a computing device for estimating a flow direction of a fluid in a flow path on the basis of an output from a sensor including a heating element arranged on a flow path forming surface that forms the flow path of the fluid and configured to generate heat according to electric power supplied from an external power supply and an outer peripheral sensor unit including three or more sensor pairs provided at intervals in a circumferential direction to surround the heating element, the sensor pair including two temperature sensors configured to sandwich the heating element and arranged opposite each other, the computing device including: a first identification unit configured to identify a sensor pair in which an output difference between an output value corresponding to a temperature detected by one temperature sensor of the sensor pair and an output value corresponding to a temperature detected by the other temperature sensor of the sensor pair is largest among the three or more sensor pairs; a second identification unit configured to identify other sensor pairs adjacent to the identified sensor pair in the circumferential direction; and a flow direction estimation unit configured to estimate the flow direction of the fluid on the basis of the output difference in the sensor pair having the largest output difference and output differences in the other sensor pairs adjacent to the sensor pair in the circumferential direction.

According to the present disclosure, there is provided a flow direction estimation method of estimating a flow direction of a fluid in a flow path on the basis of an output from a sensor including a heating element arranged on a flow path forming surface that forms the flow path of the fluid and configured to generate heat according to electric power supplied from an external power supply and an outer peripheral sensor unit including three or more sensor pairs provided at intervals in a circumferential direction to surround the heating element, the sensor pair including two temperature sensors configured to sandwich the heating element and arranged opposite each other, the flow direction estimation method including steps of: identifying the sensor pair in which an output difference between an output value corresponding to a temperature detected by one temperature sensor of the sensor pair and an output value corresponding to a temperature detected by the other temperature sensor of the sensor pair is largest among the three or more sensor pairs; identifying other sensor pairs adjacent to the identified sensor pair in the circumferential direction; and estimating the flow direction of the fluid on the basis of the output difference in the sensor pair having the largest output difference and output differences in the other sensor pairs adjacent to the sensor pair in the circumferential direction.

According to the fluid sensor system, the computing device, and the flow direction estimation method of the present disclosure, a direction of a flow of a fluid can be easily and accurately detected even in the case of installation in a limited installation space.

DESCRIPTION OF EMBODIMENTS

Hereinafter, embodiments for implementing a fluid sensor system, a computing device, and a flow direction estimation method according to the present disclosure will be described with reference to the accompanying drawings. However, the present disclosure is not limited to only these embodiments.
(Configuration of Fluid Sensor System)

Figure 1:
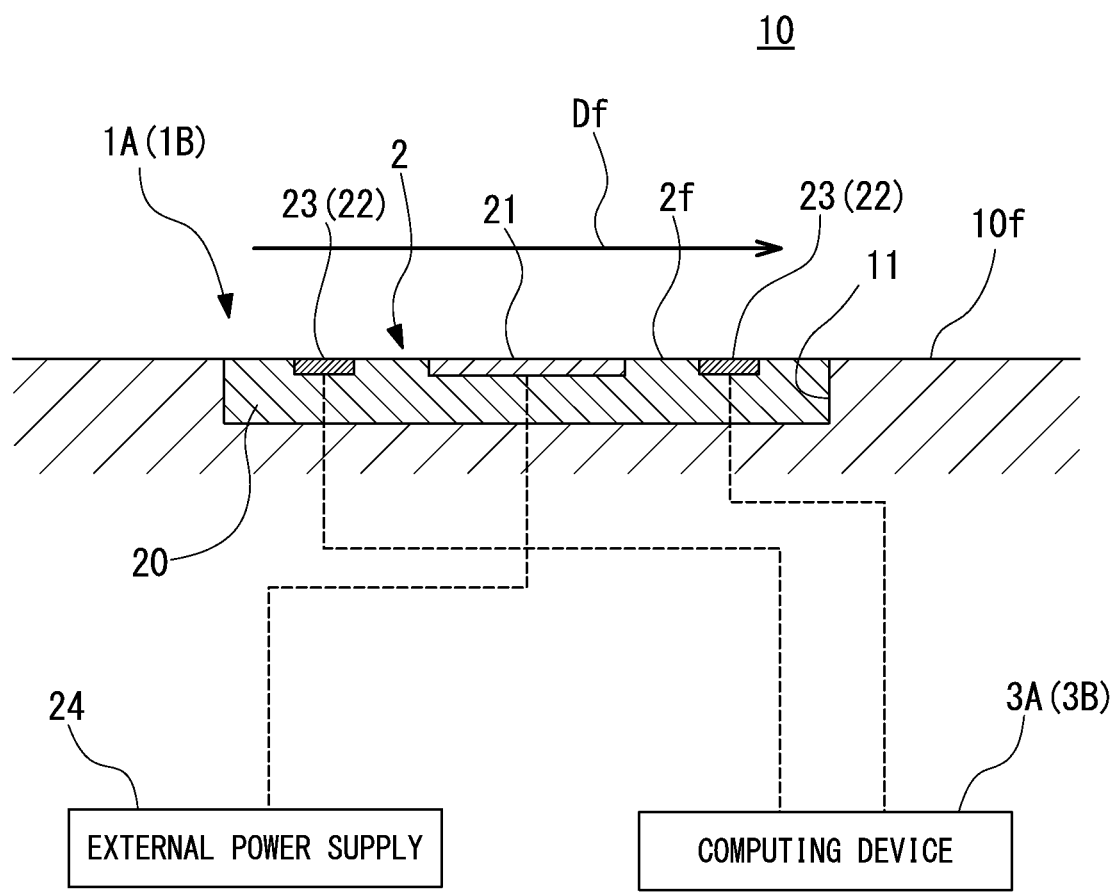
FIG. 1 is a diagram showing a schematic configuration of a fluid sensor system according to an embodiment of the present disclosure.

A fluid sensor system 1A shown in FIG. 1 estimates (detects) a flow direction Df of a fluid flowing through a flow path 10 of the fluid. This fluid sensor system 1A is applied to various types of machines, equipment, and the like including a flow path through which a fluid flows, such as, for example, a steam turbine, a gas turbine, a compressor, and a wind tunnel facility. The fluid sensor system 1A can also be applied to pipes, ducts, and the like that form a flow path through which a fluid flows. Also, for example, even if a moving object such as a wing or fuselage of an aircraft, the hull of a watercraft, or the body of a vehicle moves and therefore a velocity difference relative to a surrounding gas (e.g., air) or liquid (e.g., water) occurs and the surrounding gas or liquid is considered to flow relative to the moving object, the fluid sensor system 1A is also applicable thereto. The fluid whose flow direction Df is estimated in the fluid sensor system 1A may be, for example, a gas such as air or a liquid such as water.

The fluid sensor system 1A includes a sensor 2 and a computing device 3A.

The sensor 2 is arranged on a flow path forming surface 10$f$ that defines the flow path 10 of the fluid. The sensor 2 is plate-shaped and buried in a concave portion 11 formed on the flow path forming surface 10$f$. The sensor 2 is installed so that the sensor surface 2$f$ facing the flow path 10 side is continuous with the flow path forming surface 10$f$. Thereby, an influence on the flow of the fluid due to protruding of a part of the sensor 2 protrudes from the flow path forming surface 10$f$ into the flow path 10 is suppressed. Also, the sensor 2 may not be formed in the concave portion 11 and may be joined to the flow path forming surface 10$f$ using appropriate joining means such as an adhesive or double-sided tape. Also, according to the purpose, the sensor 2 may be detachably fixed to the flow path forming surface 10$f$. Also, a plurality of sensors 2 may be configured to be arranged along the flow path 10.

Figure 2:
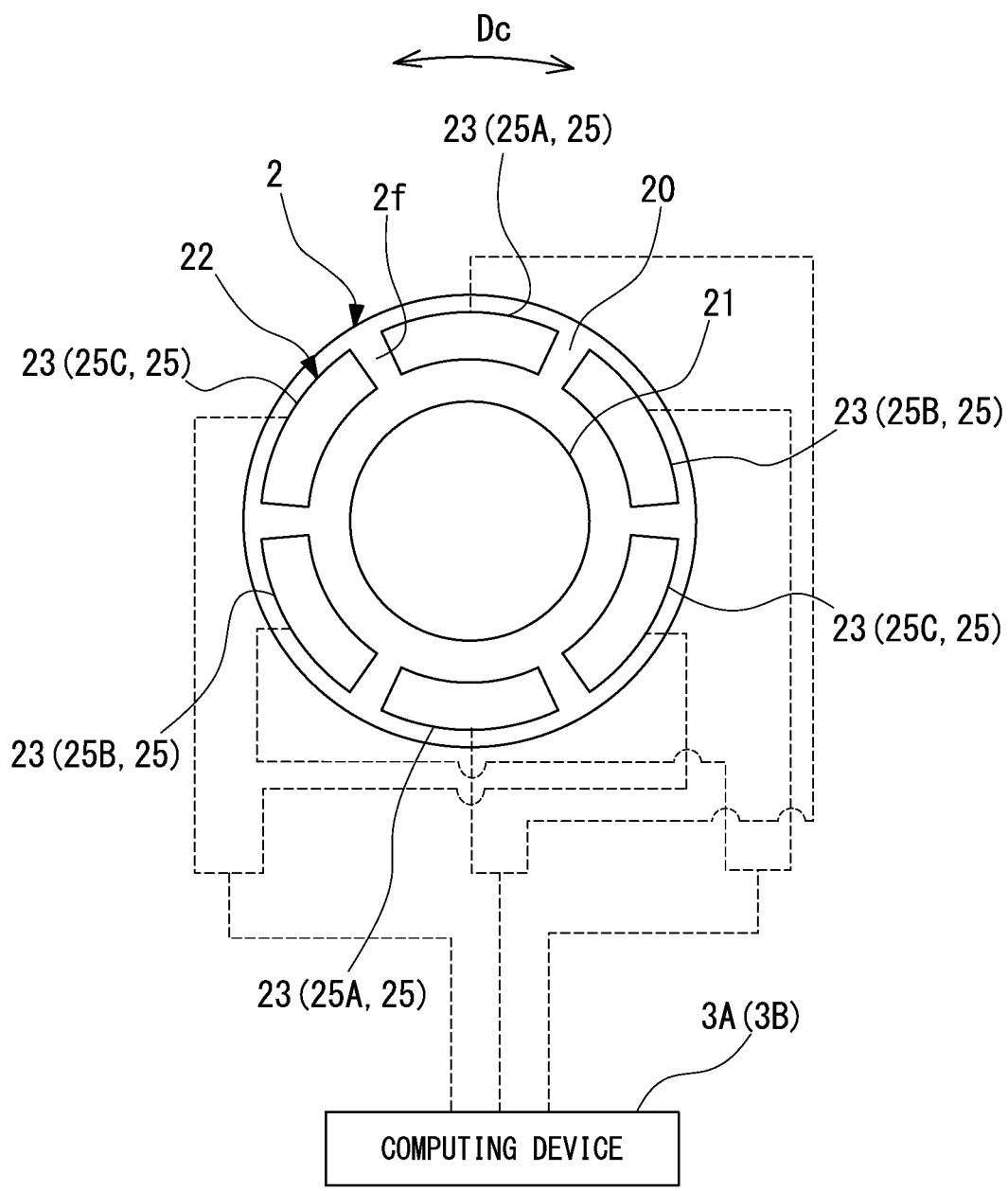
FIG. 2 is a plan view showing a sensor of the fluid sensor system.

As shown in FIGS. 1 and 2, the sensor 2 includes a sensor substrate 20, a heating element 21, and an outer peripheral sensor unit 22. The sensor substrate 20 is plate-shaped and holds the heating element 21 and the outer peripheral sensor unit 22. The heating element 21 is arranged on a central portion of the sensor substrate 20 when viewed in a direction orthogonal to a sensor surface 2$f$. The heating element 21 is connected to an external power supply 24 via a power supply wiring. The heating element 21 is configured to be able to generate heat with electric power supplied from the external power supply 24. The heating element 21 generates heat at a temperature higher than a temperature of the fluid flowing through the flow path 10.

As shown in FIG. 2, the outer peripheral sensor unit 22 is arranged on the outer peripheral portion of the heating element 21 when viewed in a direction orthogonal to the sensor surface 2$f$. The outer peripheral sensor unit 22 includes a plurality of temperature sensors 23 provided at equal intervals in a circumferential direction Dc centered on the heating element 21. For the plurality of temperature sensors 23, a sensor pair 25 includes two temperature sensors 23 configured to sandwich the heating element 21 and arranged at both sides thereof. That is, one sensor pair 25 includes the two temperature sensors 23 configured to sandwich the heating element 21 and arranged opposite each other at both sides thereof. The two temperature sensors 23 constituting each sensor pair 25 are configured to sandwich the heating element 21 and arranged at one side and the other side of the heating element 21 in a radial direction.

The outer peripheral sensor unit 22 includes three or more sensor pairs 25, i.e., a total of six or more temperature sensors 23. In the present embodiment, the outer peripheral sensor unit 22 includes three sensor pairs 25 and six temperature sensors 23. These temperature sensors 23 are arranged concentrically around the heating element 21. The outer peripheral sensor unit 22 may include eight or more temperature sensors 23. However, when the number of temperature sensors 23 excessively increases, unless the size of the sensor 2 is changed, an output difference between two or more sensor pairs 25 is small and an influence of noise is likely to be received, and therefore it may be difficult to estimate the flow direction Df of the fluid as will be described below. Also, if the number of temperature sensors 23 (sensor pairs 25) is increased, the number of wirings increases at the same time and the wirings become an obstacle when the two or more sensors 2 are arranged on a flow path surface at a high density. Thus, the number of temperature sensors 23 constituting the outer peripheral sensor unit 22 is, for example, preferably about six or eight. Also, if it is possible to increase the size of the sensor 2 in terms of a space, an influence of noise and a problem due to an increase in the number of wirings when the number of temperature sensors 23 (sensor pairs 25) is increased are unlikely to occur by increasing the size of the sensor 2.

Each temperature sensor 23 detects the temperature within the flow path 10. Each temperature sensor 23 outputs the detected temperature or an output value such as a potential corresponding to the detected temperature as a detection signal to the computing device 3A. In the embodiment of the present disclosure, each temperature sensor 23 outputs a potential value (an output value) corresponding to the detected temperature as the detection signal.

The upstream side of the flow direction Df of the fluid is unlikely to be affected by the heat generated by the heating element 21, whereas the fluid temperature increases due to an influence of the heat generated by the heating element 21 at the downstream side of the flow direction Df. Thus, when an array direction of the sensor pair 25 including the two temperature sensors 23 follows the flow direction Df of the fluid, an output difference (a potential difference) occurs between the output value (the potential value) corresponding to the temperature detected by the temperature sensor 23 located at the upstream side in the flow direction Df and the output value (the potential value) corresponding to the temperature detected by the temperature sensor 23 located at the downstream side in the flow direction Df.

Figure 3:
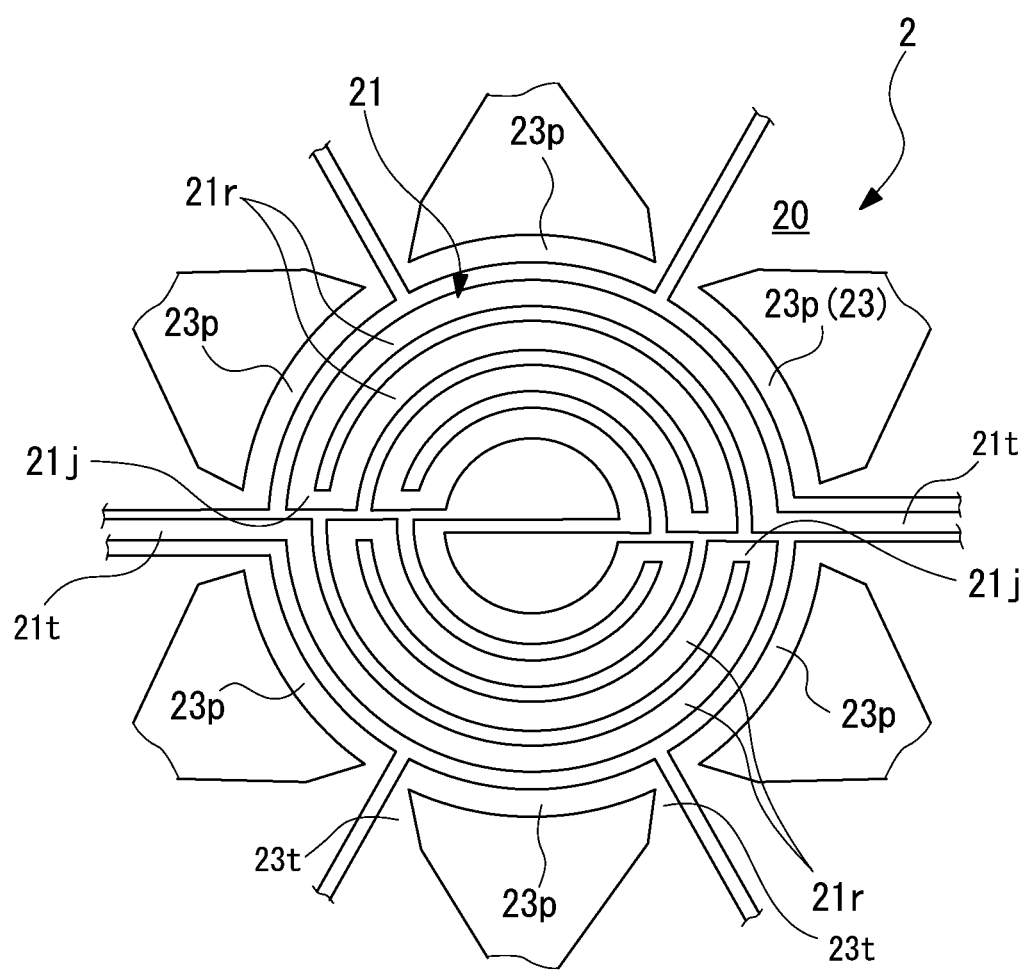
FIG. 3 is a diagram showing an example of a specific structure of the sensor.

FIG. 3 is a diagram showing an example of a specific wiring pattern of the sensor 2 as described above.

As shown in FIG. 3, each of the heating element 21 and the temperature sensor 23 is formed by a conductive film formed on the sensor substrate 20. The heating element 21 includes a plurality of semicircular arc-shaped patterns 21r formed concentrically and a connection pattern 21j that connects the semicircular arc-shaped patterns 21r radially adjacent to each other. Both ends of the heating element 21 are continuous with a terminal pattern 21t connected to the external power supply 24 (see FIG. 1). Each temperature sensor 23 has a sensor pattern 23p extending in an arc shape at the outer periphery of the heating element 21. Both ends of the sensor pattern 23p are continuous with a terminal pattern 23t connected to the computing device 3A (see FIGS. 1 and 2). Also, a wiring pattern constituting the sensor 2 is not limited to the example shown in FIG. 3 and can be changed as appropriate.

(Configuration Diagram of Hardware of Computing Device)

Figure 4:
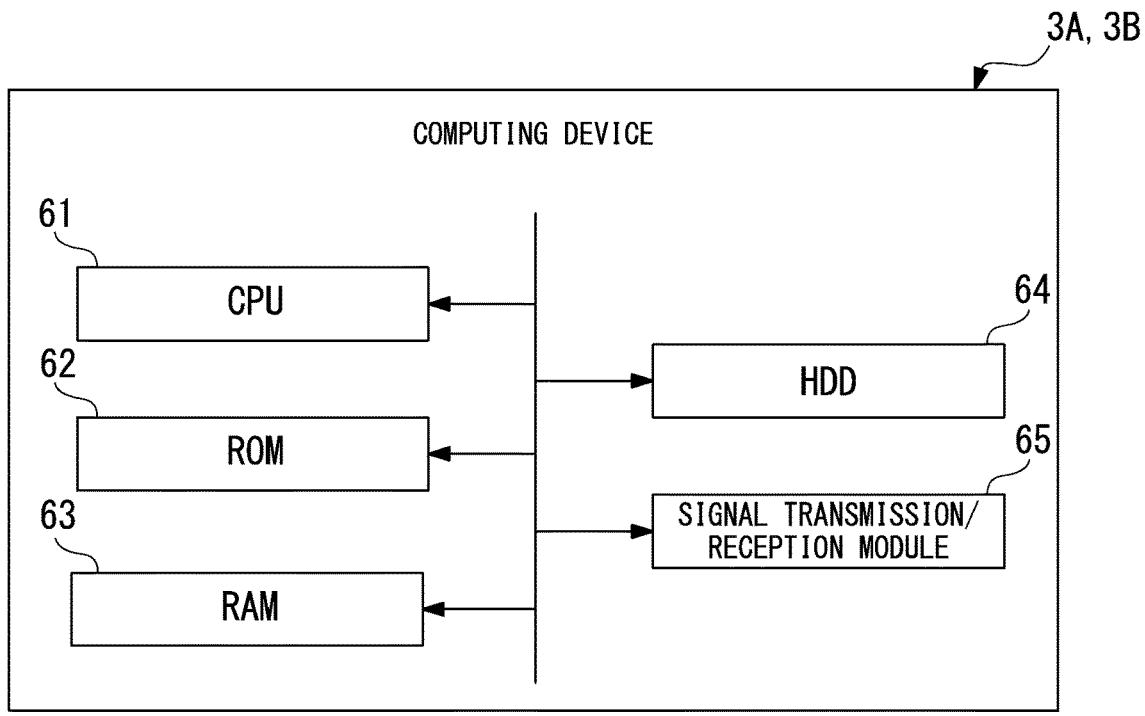
FIG. 4 is a diagram showing a hardware configuration of a computing device according to the embodiment of the present disclosure.

As shown in FIG. 4, the computing device 3A is a computer including a central processing unit (CPU) 61, a read only memory (ROM) 62, a random access memory (RAM) 63, a hard disk drive (HDD) 64, and a signal transmission/reception module 65. The signal transmission/reception module 65 receives a detection signal from each temperature sensor 23.

(Functional Block Diagram)

Figure 5:
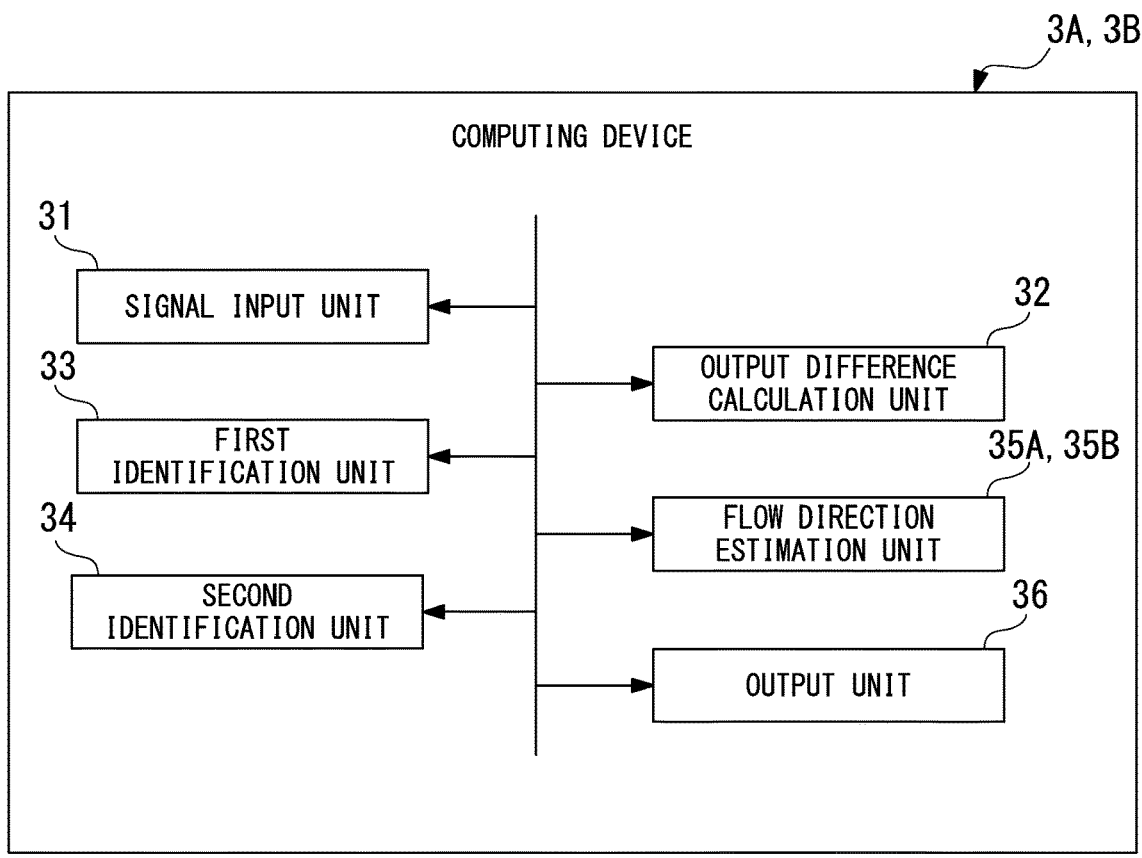
FIG. 5 is a functional block diagram of a computing device according to the embodiment of the present disclosure.

As shown in FIG. 5, the CPU 61 of the computing device 3A executes a program stored in the computing device in advance, such that a signal input unit 31, an output difference calculation unit 32, a first identification unit 33, a second identification unit 34, a flow direction estimation unit 35A, and an output unit 36 are provided. The computing device 3A estimates the flow direction Df of the fluid in the flow path 10 based on the output from the sensor 2.

The signal input unit 31 is a signal transmission/reception module 65 in hardware and receives a detection signal from each temperature sensor 23.

The output difference calculation unit 32 calculates an output difference value which is a difference between the potential value detected by one temperature sensor 23 and the potential value detected by the other temperature sensor 23 in each sensor pair 25.

The first identification unit 33 identifies the sensor pair 25 having a largest output difference among the three sensor pairs 25 on the basis of the output difference values in the sensor pairs 25 calculated by the output difference calculation unit 32.

The second identification unit 34 identifies the other sensor pairs 25 adjacent to the sensor pair 25 having the largest output difference identified by the first identification unit 33 at both sides in the circumferential direction Dc.

The flow direction estimation unit 35A estimates the flow direction Df of the fluid on the basis of the output difference in the sensor pair 25 having the largest output difference and the output differences in the other sensor pairs 25 adjacent in the circumferential direction Dc.

As will be described in detail below, the flow direction estimation unit 35A sets a direction in which the two temperature sensors 23 of the sensor pair 25 having the largest output difference are connected as a reference flow direction H of the fluid (see FIG. 6). Further, the flow direction estimation unit 35A calculates an inclination angle θ (see FIG. 6) of a flow of a fluid to the reference flow direction H on the basis of the output differences in the other sensor pairs 25 adjacent to the sensor pair 25 having the largest output difference in the circumferential direction Dc (see FIG. 6). The flow direction estimation unit 35A estimates the flow direction Df of the fluid on the basis of the reference flow direction H set on the basis of the sensor pair 25 having the largest output difference and the inclination angle θ calculated on the basis of the output differences in the other sensor pairs 25 adjacent in the circumferential direction Dc. The flow direction estimation unit 35A performs a correction process based on the inclination angle θ with respect to the reference flow direction H and estimates the flow direction Df of the fluid.

Figure 6:
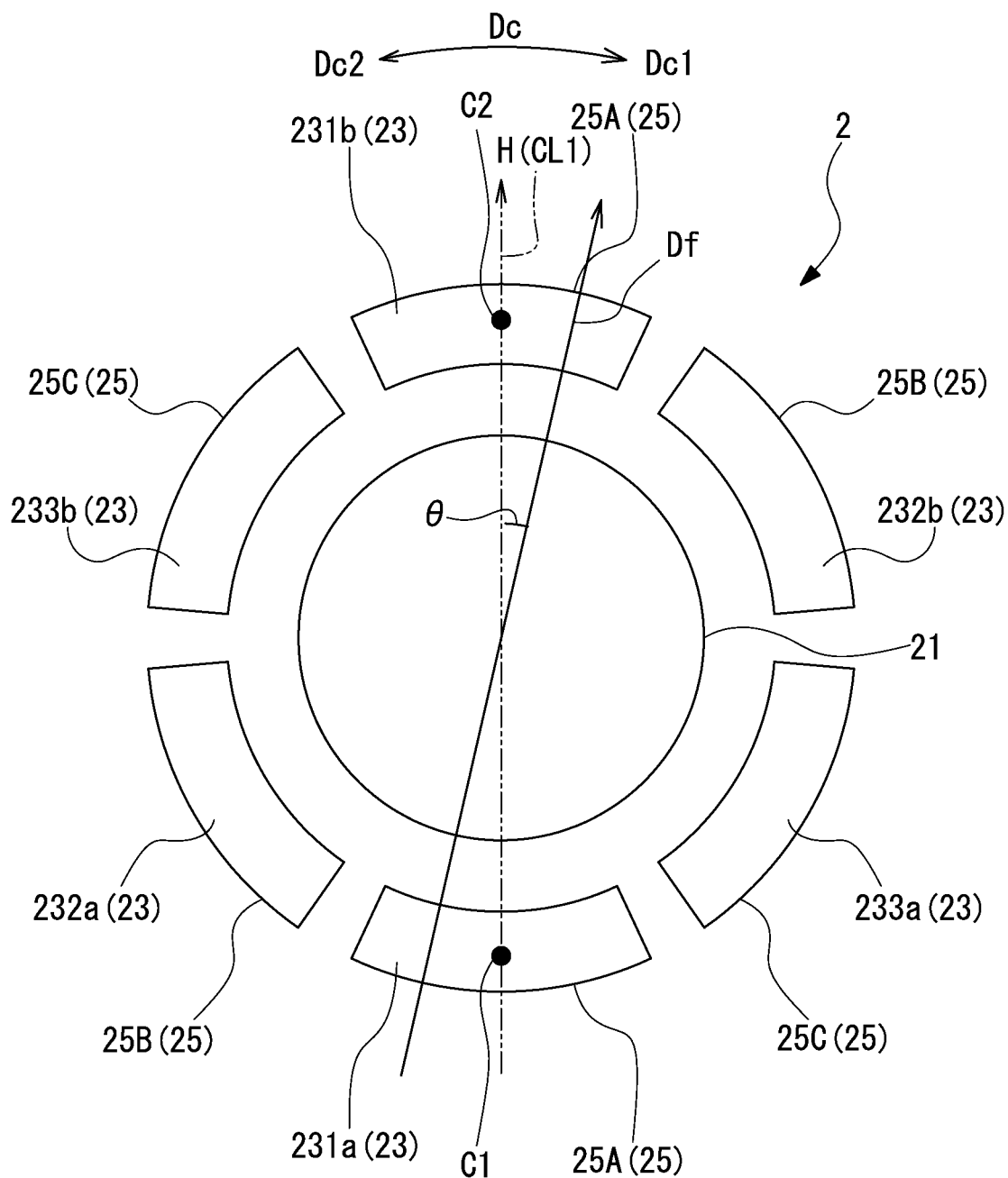
FIG. 6 is a diagram showing an example of a relationship between the sensor and a flow of a fluid.

For example, as shown in FIG. 6, it is assumed that the flow direction Df of the fluid straddles one temperature sensor 231a and the other temperature sensor 231b constituting the first sensor pair 25A among the three sensor pairs 25. In this case, the temperature of the fluid rises due to the influence of heat generation by the heating element 21 at the downstream side of the flow direction Df of the fluid. Thus, the temperature sensor 231b located at the downstream side detects the temperature rise of the fluid with respect to the temperature sensor 231a located at the upstream side of the flow direction Df of the fluid. Thus, in the first sensor pair 25A, the difference between the temperature detected by one temperature sensor 231a and the temperature detected by the other temperature sensor 231b increases and the output difference between the output potential values increases.

On the other hand, temperature sensors 232a and 232b constituting the second sensor pair 25B among the three sensor pairs 25 and temperature sensors 233a and 233b constituting the third sensor pair 25C among the three sensor pairs 25 are arranged at both sides in the direction intersecting the flow direction Df of the fluid. Thus, an amount of fluid with a temperature rising due to the heat generation of the heating element 21 flowing on the temperature sensors 232a and 232b and the temperature sensors 233a and 233b is small and an influence of the heat generation of the heating element 21 is unlikely to be received. As a result, the output difference between the temperatures detected by the temperature sensors 232a and 232b of the second sensor pair 25B and the output difference between the temperatures detected by the temperature sensors 233a and 233b of the third sensor pair 25C are less than the output difference in the first sensor pair 25A.

In the example of FIG. 6, when the output difference calculation unit 32 calculates the output differences in the first sensor pair 25A, the second sensor pair 25B, and the third sensor pair 25C, the output difference in the first sensor pair 25A is greater than the output differences in the second sensor pair 25B and the third sensor pair 25C. Thus, the first identification unit 33 identifies that the first sensor pair 25A is the sensor pair 25 having the largest output difference.

The second identification unit 34 identifies the second sensor pair (one sensor pair) 25B adjacent at one side Dc1 in the circumferential direction Dc and the third sensor pair (the other sensor pair) 25C adjacent at the other side Dc2 in the circumferential direction Dc as the other sensor pairs 25 adjacent to the first sensor pair 25A having the largest output difference in the circumferential direction Dc.

In the flow direction estimation unit 35A, a direction CL1 in which a center C1 of one temperature sensor 231a constituting the first sensor pair 25A having the largest output difference in the circumferential direction Dc and a center C2 of the other temperature sensor 231b in the circumferential direction Dc are connected is set as the reference flow direction H of the fluid. Further, the flow direction estimation unit 35A calculates the inclination angle θ of the flow direction Df of the fluid to the reference flow direction H on the basis of the output differences in the second sensor pair 25B and the third sensor pair 25C adjacent to the first sensor pair 25A in the circumferential direction Dc.

Here, in the example of FIG. 6, the flow direction Df of the fluid is inclined to the one side Dc1 by the inclination angle θ in the circumferential direction Dc with respect to the reference flow direction H of the fluid (the direction CL1 in which the center C1 and the center C2 are connected). In this case, the output difference in the second sensor pair 25B adjacent to the first sensor pair 25A having the largest output difference at the one side Dc1 in the circumferential direction Dc is greater than the output difference in the third sensor pair 25C adjacent to the first sensor pair 25A at the other side Dc2 in the circumferential direction Dc. Also, as the inclination angle θ increases, the output difference in the second sensor pair 25B becomes greater than the output difference in the third sensor pair 25C.

In the flow direction estimation unit 35A, the inclination angle θ of the flow of fluid to the reference flow direction H is calculated on the basis of a difference between the output difference in the second sensor pair 25B and the output difference in the third sensor pair 25C.

In the embodiment of the present disclosure, the flow direction estimation unit 35A calculates the inclination angle θ on the basis of a ratio between the output difference in the sensor pair 25 adjacent to the sensor pair 25 having the largest output difference at the one side Dc1 in the circumferential direction Dc and the output difference in the sensor pair 25 adjacent to the sensor pair 25 having the largest output difference at the other side Dc2 in the circumferential direction Dc.

Figure 7:
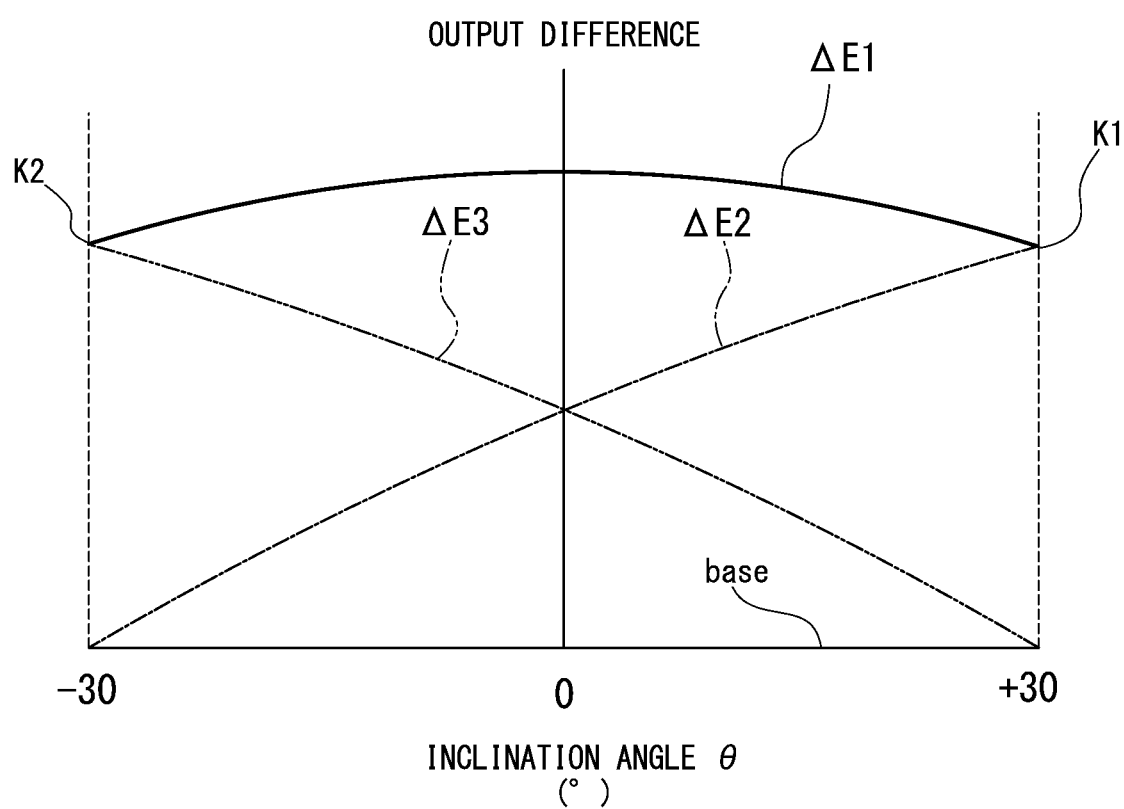
FIG. 7 is a diagram showing an example of a correlation between an inclination angle of the flow of the fluid and an output difference in each sensor pair in an example of FIG. 5.

FIG. 7 shows an example of a distribution of an output difference ΔE1 in the first sensor pair 25A, an output difference ΔE2 in the second sensor pair 25B adjacent to the first sensor pair 25A at the one side Dc1 in the circumferential direction Dc, and an output difference ΔE3 in the third sensor pair 25C adjacent to the first sensor pair 25A at the other side Dc2 in the circumferential direction Dc corresponding to the inclination angle θ of the flow direction Df of the fluid in the example of FIG. 6.

As shown in FIG. 6, a total of six temperature sensors 23 of the outer peripheral sensor unit 22 are arranged at equal intervals of 60° in the circumferential direction Dc. Thus, the inclination angle θ formed with respect to the reference flow direction H is less than ±30°. In such a range of inclination angle θ, as shown in FIG. 7, the output difference ΔE1 in the first sensor pair 25A is greater than the output difference ΔE2 in the second sensor pair 25B and the output difference ΔE3 in the third sensor pair 25C. The output difference ΔE1 in the first sensor pair 25A is maximum when the inclination angle θ=0° and decreases as an absolute value of the inclination angle θ increases.

The output difference ΔE2 in the second sensor pair 25B and the output difference ΔE3 in the third sensor pair 25C are equivalent when the inclination angle θ=0°. The output difference ΔE2 in the second sensor pair 25B increases as the inclination angle θ increases and decreases as the inclination angle θ decreases. The output difference ΔE3 in the third sensor pair 25C decreases as the inclination angle θ increases and increases as the inclination angle θ decreases. A state in which a sum of the output difference ΔE2 of the second sensor pair 25B and the output difference ΔE3 of the third sensor pair 25C is substantially constant regardless of the inclination angle θ has been confirmed in analysis, experiments, and the like.

The flow direction estimation unit 35A calculates the inclination angle θ on the basis of a ratio ΔE2/ΔE1, which is the ratio of the output difference ΔE2 of the second sensor pair 25B to the output difference ΔE1 in the first sensor pair 25A, and a ratio ΔE3/ΔE1, which is the ratio of the output difference ΔE3 in the third sensor pair 25C to the output difference ΔE1 in the first sensor pair 25A, according to the following Eq. (1).

$$\theta = (a/h) \times \{(\Delta E2/\Delta E1 - \text{base})/(\Delta E2/\Delta E1 - \text{base} + \Delta E3/\Delta E1 - \text{base})\} - a/2 \quad (1)$$

Here, the above "a" is the arrangement angle of the temperature sensor 23 and, when there are six temperature sensors as shown in FIG. 6, a=360°/6=60°. The above "base" is a value of the output difference ΔE3 in the third sensor pair 25C at point K1 where ΔE1=ΔE2, or a value of the output difference ΔE2 in the second sensor pair 25B at point K2 where ΔE1=ΔE3 in FIG. 7. When there are six temperature sensors 23, base=0. The above "h" is an adjustment coefficient for a gradient of an estimation function and can be arbitrarily set so that the prediction accuracy increases. For example, the adjustment coefficient h can be determined from a graph of a flow angle and an output value when the test is performed in advance or can be set by approximating the above Eq. (1) with a cos function. In the present embodiment, for example, h=1 in the case of the arrangement angle a=60° of the temperature sensor 23, h=0.95 when a=45°, and h=0.90 when a=36°.

Then, when there are six temperature sensors as shown in FIG. 6, the above Eq. (1) is as follows.

$$\theta = 60° \times \Delta E2/(\Delta E2 + \Delta E3) - 30°$$

In the above Eq. (1), for example, the output difference ΔE1 in the first sensor pair 25A may be approximated to cos θ, the output difference ΔE2 in the second sensor pair 25B may be approximated to cos(θ−a), and the output difference ΔE3 in the third sensor pair 25C may be approximated to cos(θ+a).

In the flow direction estimation unit 35A, on the basis of the inclination angle θ calculated by the above Eq. (1), a correction process based on the inclination angle θ to the reference flow direction H is performed and the flow direction Df of the fluid is estimated.

Figure 8:
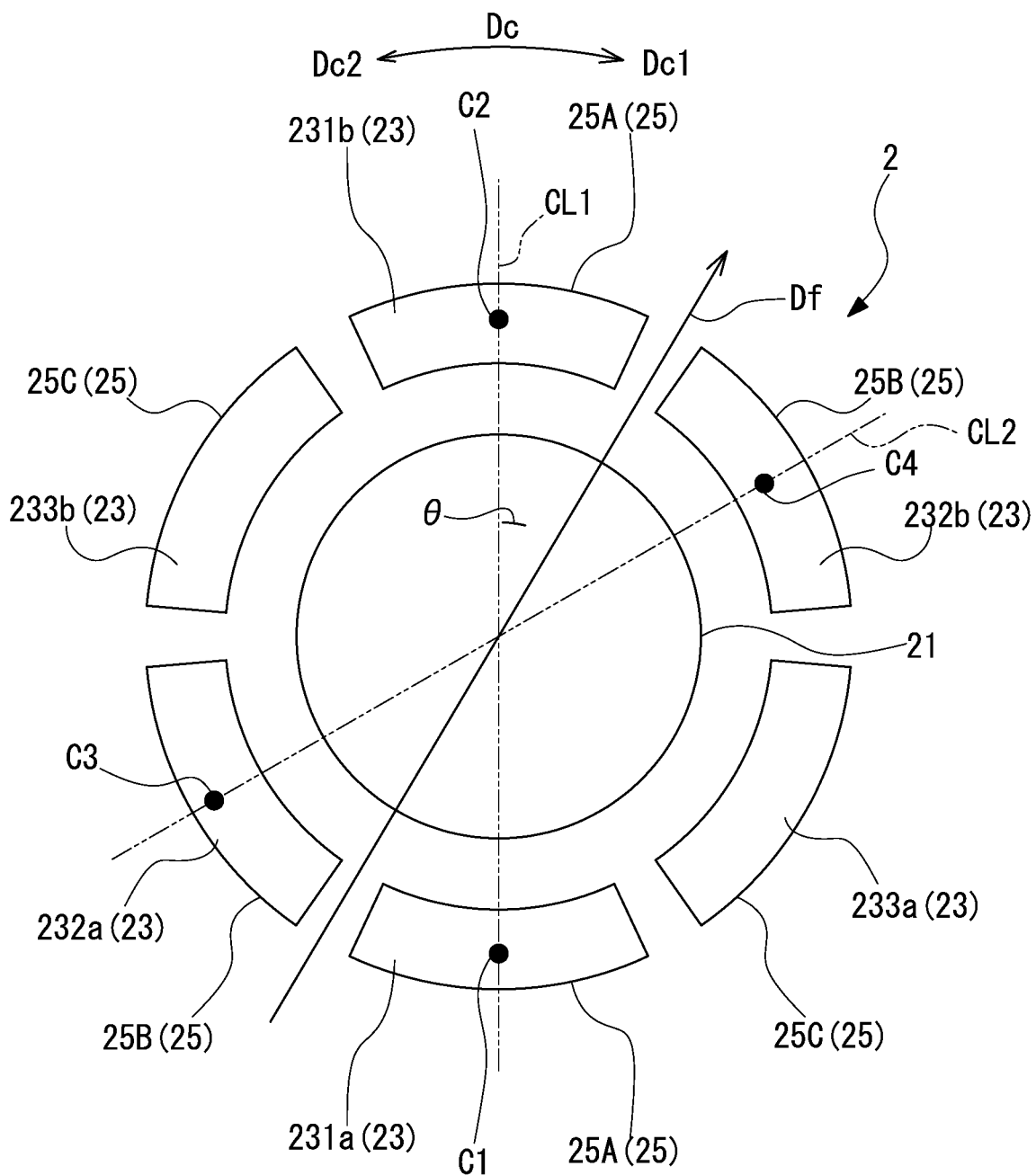
FIG. 8 is a diagram showing another example of the relationship between the sensor and the flow of the fluid.

Meanwhile, as shown in FIG. 8, when the flow direction Df of the fluid passes through the middle of the two sensor pairs 25 adjacent in the circumferential direction Dc (for example, the first sensor pair 25A and the second sensor pair 25B in the example of FIG. 8), the output difference in the first sensor pair 25A is approximately equal to the output difference in the second sensor pair 25B.

In this case, the first identification unit 33 identifies two pairs that are the first sensor pair 25A and the second sensor pair 25B as the sensor pair 25 having the largest output difference. In this case, the flow direction estimation unit 35A estimates an intermediate direction between a direction CL1 in which the centers C1 and C2 of the temperature sensors 23 (the temperature sensors 231a and 231b) of one sensor pair 25 (the first sensor pair 25A) between the two sensor pairs 25 that have been identified are connected and a direction CL2 in which the centers C3 and C4 of the temperature sensors 23 (the temperature sensors 232a and 232b) of the other sensor pair 25 (the second sensor pair 25B) are connected as the flow direction Df of the fluid.

The output unit 36 externally outputs information about the flow direction Df of the fluid estimated by the flow direction estimation unit 35A. The output unit 36 is a device capable of externally outputting information such as a monitor, a display screen of a tablet terminal or a smartphone, or a printer. The information about the flow direction Df of the fluid output by the output unit 36 has various forms such as, for example, a numerical value, numerical information for representing the flow direction Df of the fluid, character information, and graphic information using arrows and the like.

(Pre-Adjustment of Sensor)

In the sensor 2 as described above, if there is an error in the output difference between the two or more sensor pairs 25, the accuracy of estimation of the flow direction Df of the fluid is adversely affected. Thus, it is preferable to perform pre-adjustment of the internal circuit resistance between the two or more sensor pairs 25 constituting the sensor 2.

Figure 9:
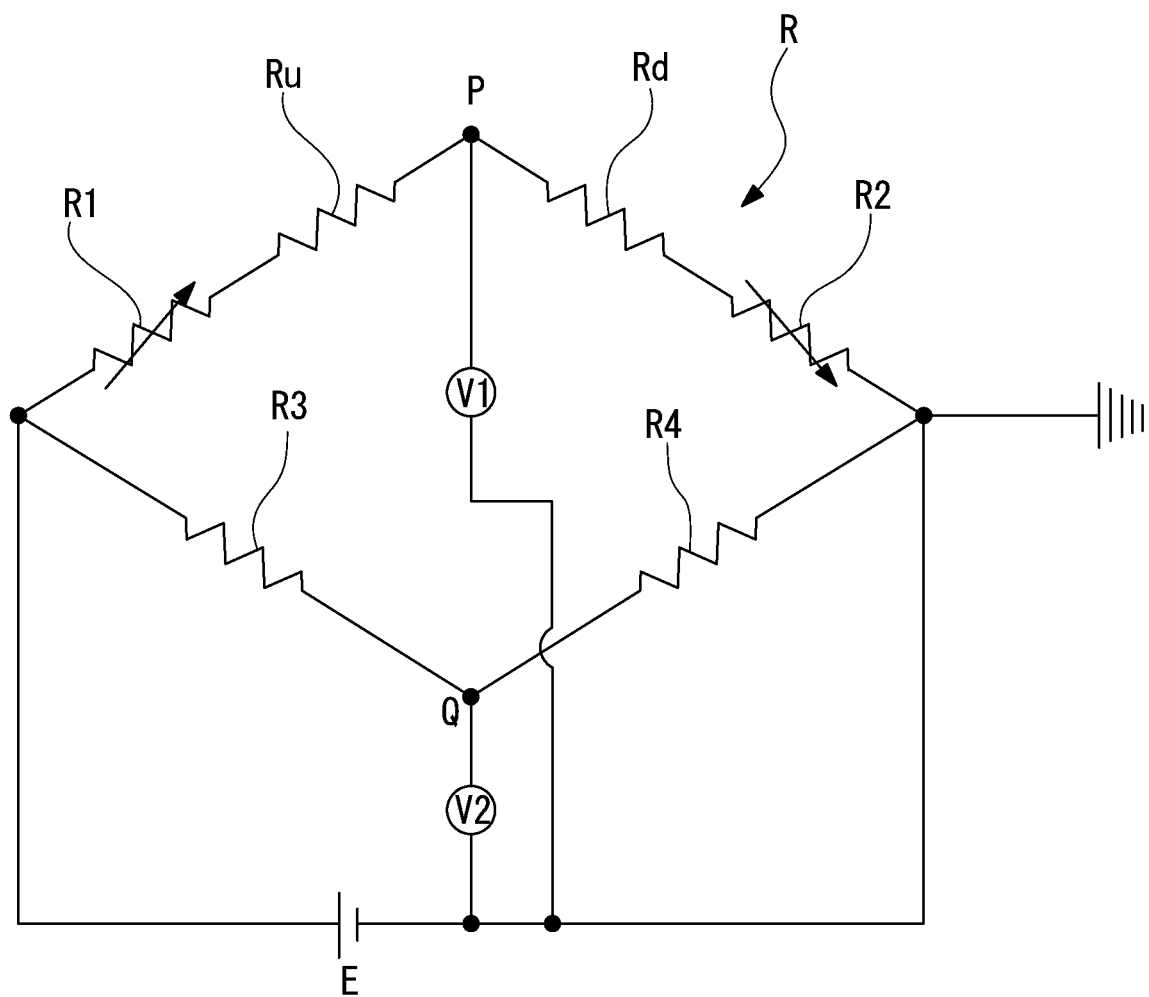
FIG. 9 is a diagram showing an example of a circuit configuration of the sensor.

The pair of temperature sensors 23 constituting each sensor pair 25 include a bridge circuit R as shown in FIG. 9. The bridge circuit R includes variable resistors $R_1$ and $R_2$, fixed resistors $R_3$ and $R_4$, and internal resistors $R_u$, and $R_d$. Here, the variable resistors $R_1$ and $R_2$ are for resistance adjustment in the bridge circuit R. The internal resistors $R_u$ and $R_d$ are an internal resistor of the pair of temperature sensors 23 of the sensor pair 25 themselves and an internal resistor of a substrate on which the temperature sensor 23 is provided.

When a sensor voltage E has been applied in this bridge circuit R, an output voltage of the bridge circuit R becomes a potential difference (output difference) e between a point P between the variable resistors $R_1$ and the internal resistor $R_u$ and the variable resistor $R_2$ and the internal resistor $R_d$ and a point Q between the fixed resistor $R_3$ and the fixed resistor $R_4$.

In such a bridge circuit R, a bridge output voltage $e_0$ when there is no wind is represented by the following Eq. (2).

[Math. 1]

$$e_0 = \frac{E}{R_3 + R_4} \times \frac{(R_1 + R_u)R_4 - (R_2 + R_d)R_3}{(R_1 + R_u) + (R_2 + R_d)} \quad (2)$$

On the other hand, during ventilation due to a fluid flow, internal resistance changes and internal resistance $R_u + \Delta R_u$ and internal resistance $R_d + \Delta R_d$ are given. In this case, a bridge output voltage $e_0'$ during ventilation is represented by the following Eq. (3).

[Math. 2]

$$e_0' = \frac{E}{R_3 + R_4} \times \frac{(R_1 + R_u + \Delta R_u)R_4 - (R_2 + R_d + \Delta R_d)R_3}{(R_1 + R_u + \Delta R_u) + (R_3 + R_d + \Delta R_d)} \quad (3)$$

In the sensor pair 25, if the flow direction Df is detected when the fluid is flowing, a potential difference between the output bridge voltage $e_0'$ during ventilation by the flow of the fluid and the bridge output voltage $e_0$ when there is no wind is acquired as the output difference ΔE from the temperature sensor 23. In this case, when the bridge circuit R satisfies an equilibrium condition in which $R_3 = R_4$, $R_1 + R_u = R_2 + R_d$, and $\Delta R << R$, the output difference ΔE is represented by the following Eq. (4), and the change in the output difference ΔE due to the change in the temperature difference is linear.

[Math. 3]

$$\Delta E = \frac{E}{4(R_1 + R_u)} = (\Delta R_u + \Delta R_d) \quad (4)$$

Thus, in order to pre-adjust the internal circuit resistance between the two or more sensor pairs 25 constituting the sensor 2, the internal resistances $R_u$ and $R_d$ are pre-measured in addition to the internal resistance of the temperature sensor 23.

Subsequently, in all of the plurality of sensor pairs 25, a resistance value in the variable resistor $R_1$ is adjusted so that a sum of the variable resistance $R_1$ and the internal resistance $R_u$ becomes a uniform value.

Subsequently, the variable resistance $R_2$ is adjusted so that $R_1 + R_u = R_2 + R_d$ in each of the plurality of sensor pairs 25.

In this way, the sensor 2 subjected to pre-adjustment is used to estimate the flow direction Df of the fluid.

(Processing Procedure)

Next, an estimation method S100A for the flow direction Df of the fluid in the computing device 3A as described above will be described.

Figure 10:
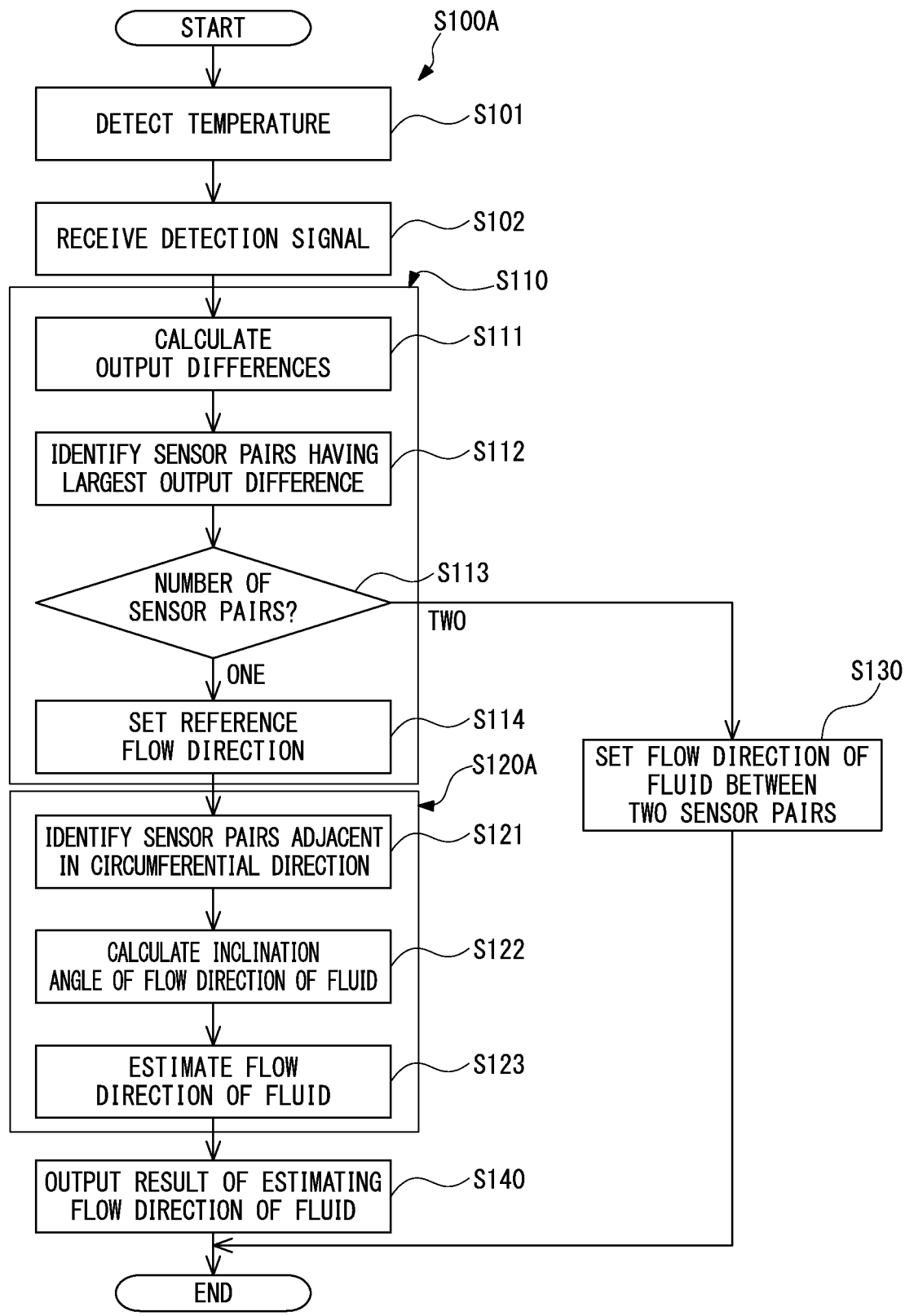
FIG. 10 is a flowchart showing a procedure for estimating a flow direction according to a first embodiment of the present disclosure.

As shown in FIG. 10, the estimation method S100A for the flow direction Df of the fluid according to the embodiment of the present disclosure mainly includes step S101 of detecting a temperature, step S102 of receiving a detection signal, step S110 of setting a reference flow direction, inclination angle calculation step S120A, step S130 of setting a flow direction of the fluid between the two sensor pairs, and step S140 of outputting a result of estimating the flow direction of the fluid.

In step S101 of detecting a temperature, the temperature sensor 23 of each sensor pair 25 detects the temperature of the flow path 10 of the fluid. Each temperature sensor 23 outputs a potential value corresponding to the detected temperature as a detection signal.

In step S102 of receiving the detection signal, the signal input unit 31 of the computing device 3A receives the detection signal from each temperature sensor 23.

The reference flow direction setting step S110 includes step S111 of calculating the output difference, step S112 of identifying sensor pairs having the largest output difference, step S113 of determining the number of sensor pairs that have been identified, and step S114 of setting a reference flow direction.

In step S111 of calculating the output difference, the output difference calculation unit 32 calculates an output difference between a potential value detected by one temperature sensor 23 and a potential value detected by the other temperature sensor 23 in each sensor pair 25.

In step S112 of identifying sensor pairs having the largest output difference, the first identification unit 33 identifies the sensor pair 25 having the largest output difference (the first sensor pair 25A in the example of FIG. 6) among the three sensor pairs 25 on the basis of the value of the output difference in each sensor pair 25 calculated in step S111. For example, a difference from the output difference calculated by the other sensor pairs 25 is calculated with respect to the output difference calculated by each of the plurality of sensor pairs 25. Among the plurality of sensor pairs 25, a sensor pair having an output difference is selected when a difference between the output difference and an output difference in other sensor pairs 25 is greater than a preset specified value. As a result, when there is only one selected sensor pair 25, the selected sensor pair 25 is identified as the sensor pair 25 having the largest output difference. Also, when there are two selected sensor pairs 25, the two sensor pairs 25 are identified as the sensor pair 25 having the largest output difference (the first sensor pair 25A and the second sensor pair 25B in the example of FIG. 8).

In step S113 of determining the number of identified sensor pairs, it is determined whether the number of sensor pairs identified as sensor pairs 25 having the largest output difference in step S112 is one or two. When the number of identified sensor pairs is one, the process proceeds to step S114. When the number of identified sensor pairs is two, the process proceeds to step S130.

In step S114 of setting the reference flow direction, the flow direction estimation unit 35A sets a direction in which the two temperature sensors 23 of the sensor pair 25 having the largest output difference are connected as the reference flow direction H of the fluid. Also, the flow direction estimation unit 35A identifies the direction of the reference flow direction H on the basis of a positive or negative value of the output difference in the sensor pair 25 having the largest output difference. After the reference flow direction H is set, the process proceeds to the inclination angle calculation step S120A.

The inclination angle calculation step S120A according to the embodiment of the present disclosure includes step S121 of identifying sensor pairs adjacent in a circumferential direction, step S122 of calculating an inclination angle in a flow direction of a fluid, and step S123 of estimating the flow direction of the fluid.

In step S121 of identifying the sensor pairs adjacent in the circumferential direction, the second identification unit 34 identifies other sensor pairs 25 adjacent to the sensor pair 25 having the largest output difference at both sides of the circumferential direction Dc (the second sensor pair 25B and the third sensor pair 25C in the example of FIG. 6).

In step S122 of calculating the inclination angle of the flow direction of the fluid, the flow direction estimation unit 35A calculates an inclination angle $\theta$ on the basis of a ratio between the output difference in the sensor pair 25 adjacent to the sensor pair 25 having the largest output difference at the one side Dc1 in the circumferential direction Dc (the second sensor pair 25B in the example of FIG. 6) and the output difference in the sensor pair 25 adjacent to the sensor pair 25 having the largest output difference at the other side Dc2 in the circumferential direction Dc (the third sensor pair 25C in the example of FIG. 6) according to the above Eq. (1).

In step S123 of estimating the flow direction of the fluid, the flow direction estimation unit 35A performs a correction process based on the inclination angle $\theta$ calculated in step S122 to the reference flow direction H set in step S114 and estimates the flow direction Df of the fluid.

In step S113, when the number of sensor pairs 25 identified to have the largest output difference is two, step S130 is executed. In step S130 of setting the flow direction of the fluid between the two sensor pairs, as shown in FIG. 8, the flow direction estimation unit 35A estimates an intermediate direction between the direction CL1 in which the centers C1 and C2 of the temperature sensors 23 (the temperature sensors 231a and 231b) of one sensor pair 25 (the first sensor pair 25A in the example of FIG. 8) between the two sensor pairs 25 that have been identified are connected and the direction CL2 in which the centers C3 and C4 of the temperature sensors 23 (the temperature sensors 232a and 232b) of the other sensor pair 25 (the second sensor pair 25B in the example of FIG. 8) are connected as the flow direction Df of the fluid.

Also, in this case, a configuration in which it is confirmed that the output difference in the sensor pair (the third sensor pair 25C in the example of FIG. 6) other than the two sensor pairs 25 identified to have the largest output difference is 0 (zero) or is less than or equal to a preset threshold value may be adopted.

Next, the process proceeds to step S140 of outputting a result of estimating the flow direction of the fluid.

In step S140 of outputting the result of estimating the flow direction of the fluid, the result of estimating the flow direction Df of the fluid estimated in steps S123 and S130 are externally output by the output unit 36.

In this way, the flow direction Df of the fluid is estimated.

(Operation and Effects)

In the fluid sensor system 1A, the computing device 3A, and the flow direction estimation method S100A having the above-described configurations, a sensor pair 25 in which an output difference between an output value corresponding to a temperature detected by one temperature sensor 23 of the sensor pair 25 and an output value corresponding to a temperature detected by the other temperature sensor 23 of the sensor pair 25 is largest among the three or more sensor pairs 25 is identified, the other sensor pairs 25 adjacent to the identified sensor pair 25 in the circumferential direction Dc are identified, and the flow direction Df of the fluid is estimated on the basis of the output difference in the sensor pair 25 having the largest output difference and output differences in the other sensor pairs 25 adjacent to the sensor pair 25 in the circumferential direction Dc.

According to this configuration, a sensor pair 25 in which an output difference between the output value corresponding to the temperature detected by one temperature sensor 23 of the sensor pair 25 and the output value corresponding to the temperature detected by the other temperature sensor 23 of the sensor pair 25 is largest is identified from among three or more sensor pairs 25. Thereby, it can be seen that the flow direction Df of the fluid overlaps a portion where the sensor pair 25 having the largest output difference is arranged in the circumferential direction Dc centered on the heating element 21. Further, in the second identification unit 34 of the computing device 3A or 3B, the other sensor pairs 25 adjacent to the sensor pair 25 identified to have the largest output difference in the circumferential direction Dc are identified. Further, it is possible to estimate the inclination angle $\theta$ of the flow direction Df of the fluid to an array direction of the sensor pair 25 having the largest output difference on the basis of the output difference in the sensor pair 25 having the largest output difference and the output differences in the other sensor pairs 25 adjacent to the sensor pair 25 having the largest output difference in the circumferential direction Dc. In this way, the flow direction Df of the fluid can be estimated. Therefore, even in the case of installation in a limited installation space, the flow direction of the fluid can be easily and accurately detected.

Also, the flow direction Df of the fluid can be easily estimated by setting a direction in which the two temperature sensors 23 of the sensor pair 25 having the largest output difference are connected as the reference flow direction H of the fluid and calculating the inclination angle $\theta$ of the flow direction Df of the fluid to the reference flow direction H on the basis of the output differences in the other sensor pairs 25 adjacent to the sensor pair 25 having the largest output difference in the circumferential direction Dc.

Also, the inclination angle $\theta$ is calculated on the basis of a ratio between the output difference in the sensor pair 25 adjacent to the sensor pair 25 having the largest output difference at one side Dc1 in the circumferential direction Dc and the output difference in the sensor pair 25C adjacent to the sensor pair 25 having the largest output difference at the other side Dc2 in the circumferential direction Dc.

When the actual flow direction Df of the fluid is inclined with respect to the reference flow direction H of the fluid set on the basis of the direction in which the two temperature sensors 23 of the sensor pair 25 having the largest output difference are connected, the output difference in the sensor pair 25B adjacent to the sensor pair 25 having the largest output difference at one side Dc1 in the circumferential direction Dc is different from the output difference in the sensor pair 25C adjacent to the sensor pair having the largest output difference at the other side Dc2 in the circumferential direction Dc. Thereby, it is possible to calculate the inclination angle $\theta$ of the actual flow direction Df of the fluid to the reference flow of the fluid on the basis of a ratio between the output difference in the sensor pair 25B adjacent at the one side Dc1 in the circumferential direction Dc and the output difference in the sensor pair 25C adjacent at the other side Dc2 in the circumferential direction Dc. In this way, it is possible to easily and accurately detect the flow direction Df of the fluid.

Also, when two sensor pairs 25 having the largest output difference are identified, it is possible to easily and accurately detect the flow direction Df of the fluid by estimating an intermediate direction between the direction in which the temperature sensors 23 of one sensor pair 25 between the two sensor pairs 25 that have been identified are connected and the direction in which the temperature sensors 23 of the other sensor pair 25 are connected as the flow direction Df of the fluid.

Second Embodiment

Next, a second embodiment of a fluid sensor system, a computing device, and a flow direction estimation method according to the present disclosure will be described. In the second embodiment described below, components, which are the same as those of the first embodiment are denoted by the same reference signs in the drawings and description thereof will be omitted. In the second embodiment, the flow direction estimation method in the flow direction estimation unit 35B is different from the first embodiment.

As shown in FIG. 1, the fluid sensor system 1B includes a sensor 2 and a computing device 3B.

As shown in FIG. 5, the computing device 3B includes a signal input unit 31, an output difference calculation unit 32, a first identification unit 33, a second identification unit 34, a flow direction estimation unit 35B, and an output unit 36.

Like the flow direction estimation unit 35A according to the first embodiment, the flow direction estimation unit 35B sets a direction in which the two temperature sensors 23 of the sensor pair 25 having the largest output difference are connected as the reference flow direction H of the fluid (see FIG. 6). Further, the flow direction estimation unit 35B calculates an inclination angle $\theta$ of a flow of a fluid to the reference flow direction H on the basis of output differences in other sensor pairs 25 adjacent to a sensor pair 25 having a largest output difference in a circumferential direction Dc. The flow direction estimation unit 35B estimates the flow direction Df of the fluid on the basis of the reference flow direction H and the calculated inclination angle $\theta$.

In the embodiment of the present disclosure, the flow direction estimation unit 35B calculates the inclination angle $\theta$ by performing a fitting process for a predetermined periodic function on the basis of the output difference in the sensor pair having the largest output difference, the output difference in the sensor pair 25 adjacent to the sensor pair 25 having the largest output difference at one side Dc1 in the circumferential direction Dc, and the output difference in the sensor pair 25 adjacent to the sensor pair 25 having the largest output difference at the other side Dc2 in the circumferential direction Dc.

Figure 11:
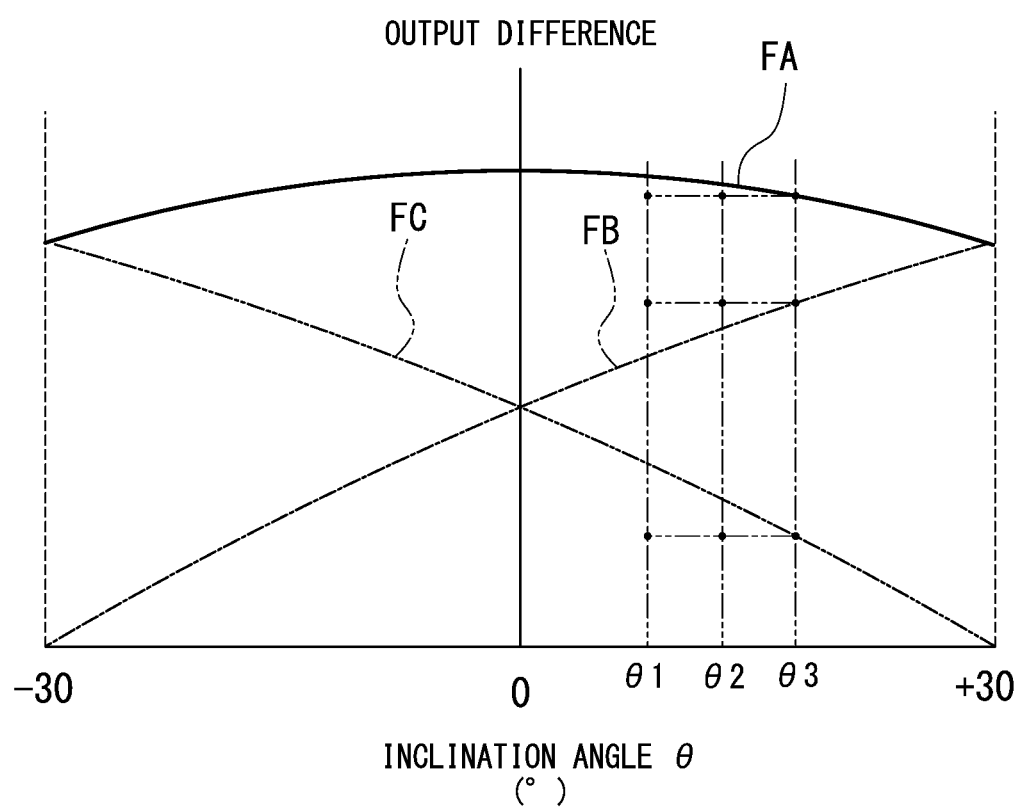
FIG. 11 is a diagram showing an example of a periodic function for use in estimating a flow direction of a fluid.

FIG. 11 shows an example of periodic functions FA, FB, and FC preset with respect to the output difference in the first sensor pair 25A, the output difference in the second sensor pair 25B adjacent to the first sensor pair 25A at the one side Dc1 in the circumferential direction Dc, and the output difference in the third sensor pair 25C adjacent to the first sensor pair 25A at the other side Dc2 in the circumferential direction Dc corresponding to the inclination angle $\theta$ of the flow direction Df of the fluid in the example of FIG. 6. Here, as the periodic functions FA, FB, and FC, a cos function, a sin function, or the like can be used. The periodic functions FA, FB, and FC correspond to installation intervals of a plurality of sensor pairs 25 in the circumferential direction Dc and are set so that the phase is shifted by, for example, 60°.

In the example of FIG. 11, the periodic function FA corresponding to the first sensor pair 25A, the periodic function FB corresponding to the second sensor pair 25B, and the period function FC corresponding to the third sensor pair 25C are set, respectively, for example, as in the following Eqs. (11), (12), and (13).

$$FA = A^* \cos \theta + B \quad (11)$$

$$FB = )A^* \cos(\theta - 60°) + B \quad (12)$$

$$FC = )A^* \cos(\theta + 60°) + B \quad (13)$$

Here, A and B are fitting parameters (constants). It is also possible to make A and B variables.

The flow direction estimation unit 35B performs a fitting process for three values that are an output difference ΔE1 in the first sensor pair 25A, an output difference ΔE2 in the second sensor pair 25B, and an output difference ΔE3 of the third sensor pair 25C calculated by the output difference calculation unit 32 using a phase angle α in the periodic functions FA, FB, and FC as a variable. For example, a least squares approximation method is used for a fitting process for the periodic functions FA, FB, and FC and the output difference ΔE1 in the first sensor pair 25A, the output difference ΔE2 in the second sensor pair 25B, and the output difference ΔE3 in the third sensor pair 25C. In the flow direction estimation unit 35B, when the phase angle α is changed, the phase angle α is identified so that a sum of mean squares of differences between values of the periodic functions FA, FB, and FC at a certain phase angle α and the output difference ΔE1 in the first sensor pair 25A, the output difference ΔE2 in the second sensor pair 25B, and the output difference ΔE3 in the third sensor pair 25C becomes minimum. In the flow direction estimation unit 35B, the phase angle α identified as described above is set as the inclination angle θ of the flow direction Df of the fluid to the reference flow direction H and the flow direction Df of the fluid is estimated.

An iterative calculation method performed at the time of fitting in the flow direction estimation unit 35B will be described with reference to FIG. 11. First, the output difference ΔE1 in the first sensor pair 25A, the output difference ΔE2 in the second sensor pair 25B, and the output difference ΔE3 in the third sensor pair 25C calculated by the output difference calculation unit 32 are represented at three points (three points vertically arranged in FIG. 11). For the values of these points, an appropriate angle θ1 is determined, the values of the above Eqs. (11) to (13) are calculated, and a sum of squares of deviations from these calculated values is calculated. Subsequently, while the angle is sequentially changed to θ2 and θ3, an angle at which the sum of squares of deviations becomes minimum is iteratively searched for. In FIG. 11, because it becomes minimum in the vicinity of θ3, the calculation is completed and α3 becomes a flow angle that has been calculated.

(Processing Procedure)

Next, the estimation method S100B for the flow direction Df of the fluid in the computing device 3B as described above will be described.

Figure 12:
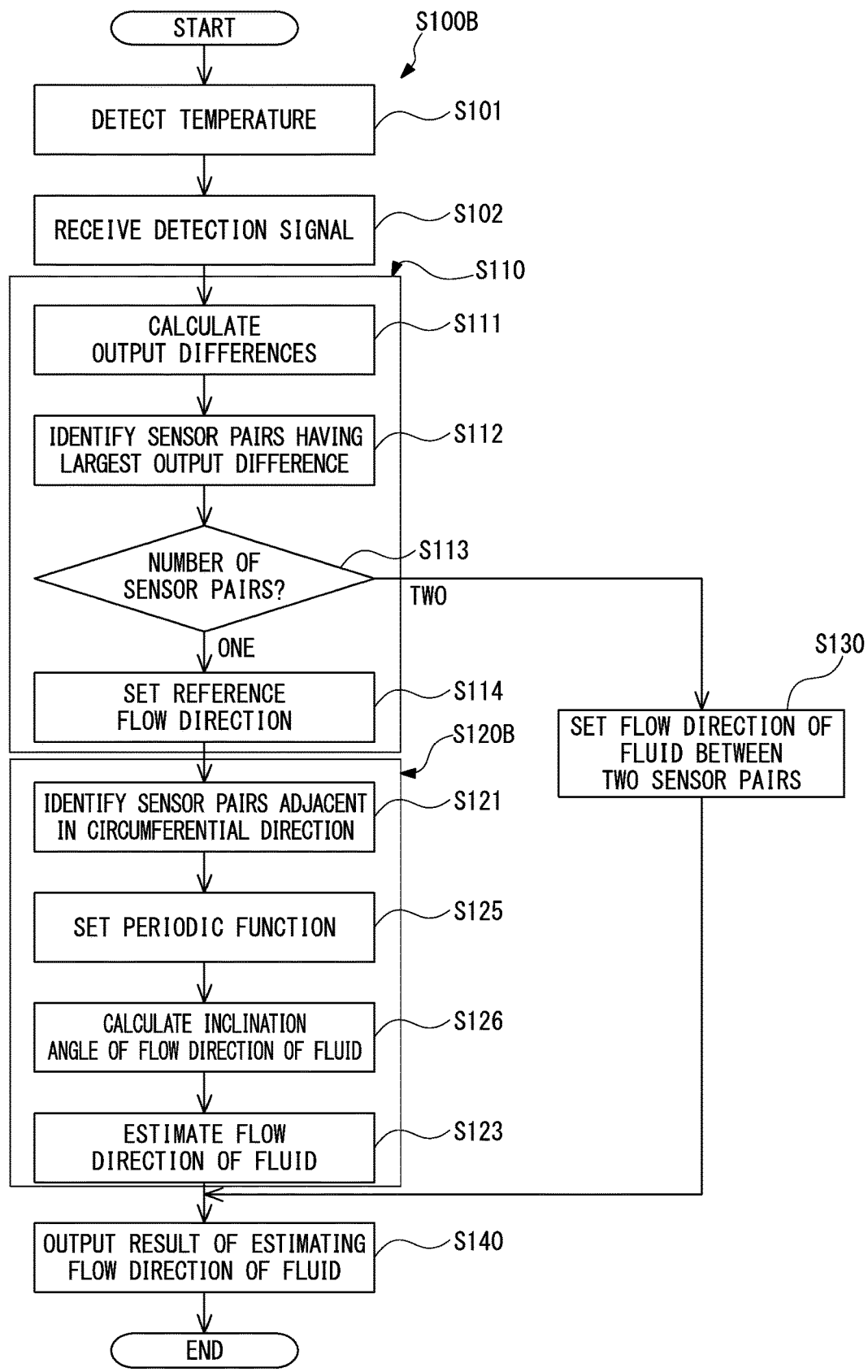
FIG. 12 is a flowchart showing a procedure for estimating a flow direction according to a second embodiment of the present disclosure.

As shown in FIG. 12, the estimation method S100B for the flow direction Df of the fluid according to the embodiment of the present disclosure mainly includes temperature detection step S101, detection signal reception step S102, reference flow direction setting step S110, inclination angle calculation step S120B, step S130 of setting a flow direction of a fluid between two sensor pairs, and step S140 of outputting a result of estimating a flow direction of the fluid.

The inclination angle calculation step S120B according to the embodiment of the present disclosure includes step S121 of identifying sensor pairs adjacent in the circumferential direction, step S125 of setting a periodic function, step S126 of calculating an inclination angle of a flow direction of a fluid, and step S123 of estimating the flow direction of the fluid.

In step S121 of identifying the adjacent sensor pairs in the circumferential direction, the second identification unit 34 identifies other sensor pairs 25 adjacent to a sensor pair 25 having a largest output difference identified in step S112 at both sides of the circumferential direction Dc (the second sensor pair 25B and the third sensor pair 25C in the example of FIG. 6).

In step S125 of setting the periodic function, the flow direction estimation unit 35B sets a periodic function for performing the fitting process. The flow direction estimation unit 35B selects, for example, the periodic functions FA, FB, and FC represented by the above Eqs. (11), (12), and (13), and sets the reference flow direction H set in accordance with the first sensor pair 25A having the largest output difference to a phase 0°. At this time, if necessary, the ranges of the fitting parameters A and B in the above Eqs. (11), (12), and (13) may be limited on the basis of information such as the position of the first sensor pair 25A and the output difference in the first sensor pair 25A.

In step S126 of calculating the inclination angle of the flow direction of the fluid, the flow direction estimation unit 35B performs a fitting process for three values that are the output difference ΔE1 in the first sensor pair 25A, the output difference ΔE2 in the second sensor pair 25B, and the output difference ΔE3 in the third sensor pair 25C using the periodic function set in step S125. The flow direction estimation unit 35B performs the fitting process for the three values that are the output difference ΔE1 in the first sensor pair 25A, the output difference ΔE2 in the second sensor pair 25B, and the output difference ΔE3 in the third sensor pair 25C calculated by the output difference calculation unit 32 in, for example, a least squares approximation method, using the phase angle α in the periodic functions FA, FB, and FC as a variable. The flow direction estimation unit 35B identifies the phase angle α so that the values of the periodic functions FA, FB, and FC, the output difference ΔE1 in the first sensor pair 25A, the output difference ΔE2 in the second sensor pair 25B, and the output difference ΔE3 in the third sensor pair 25C are approximated. In the flow direction estimation unit 35B, the phase angle α identified as described above is calculated as the inclination angle θ of the flow direction Df of the fluid to the reference flow direction H.

In step S123 of estimating the flow direction of the fluid, the flow direction estimation unit 35B performs a correction process based on the inclination angle θ (the phase angle α) calculated in step S126 with respect to the reference flow direction H set in step S114 and estimates the flow direction Df of the fluid.

(Operation and Effects)

In the fluid sensor system 1B, the computing device 3B, and the flow direction estimation method S100B having the above-described configurations, the flow direction Df of the fluid can be easily and accurately detected by performing a fitting process for a periodic function using the output difference in the sensor pair 25 having the largest output difference, the output difference in the sensor pair 25 adjacent to the sensor pair having the largest output difference at one side Dc1 in the circumferential direction Dc, and the output difference in the sensor pair 25 adjacent to the sensor pair 25 having the largest output difference at the other side Dc2 in the circumferential direction Dc.

Also, as in the first embodiment, the sensor pair 25 having the largest output difference is identified, the other sensor pairs 25 adjacent to the identified sensor pair 25 in the circumferential direction Dc are identified, and the flow direction Df of the fluid is estimated on the basis of the output difference in the sensor pair 25 having the largest output difference and the output differences in the other sensor pairs 25 adjacent to the sensor pair 25 having the largest output difference in the circumferential direction Dc. Thereby, even in the case of installation in a limited installation space, it is possible to easily and accurately detect a flow direction of a fluid.

Modified Examples of Second Embodiment

Although the inclination angle θ is calculated by performing a fitting process for the output difference in the sensor pair 25 having the largest output difference, the output difference in the sensor pair 25 adjacent to the sensor pair 25 having the largest output difference at one side Dc1 in the circumferential direction Dc, and the output difference in the sensor pair 25 adjacent to the sensor pair 25 having the largest output difference at the other side Dc2 in the circumferential direction Dc using a periodic function in the above-described second embodiment, the present disclosure is not limited thereto.

For example, instead of the periodic function, reference data of the output difference in the sensor pair 25 having the largest output difference, the output difference in the sensor pair 25 adjacent to the sensor pair 25 having the largest output difference at one side Dc1 in the circumferential direction Dc, and the output difference in the sensor pair 25 adjacent to the sensor pair 25 having the largest output difference at the other side Dc2 in the circumferential direction Dc when the phase angle α changes obtained by an experiment performed in advance and the like may be used.

Furthermore, machine learning may be used to correct a periodic function and reference data.

Other Embodiments

Although the embodiments of the present disclosure have been described above in detail with reference to the drawings, the specific configurations are not limited to these embodiments and design changes and the like are included within the scope without departing from the subject matter of the present disclosure.

Figure 13:
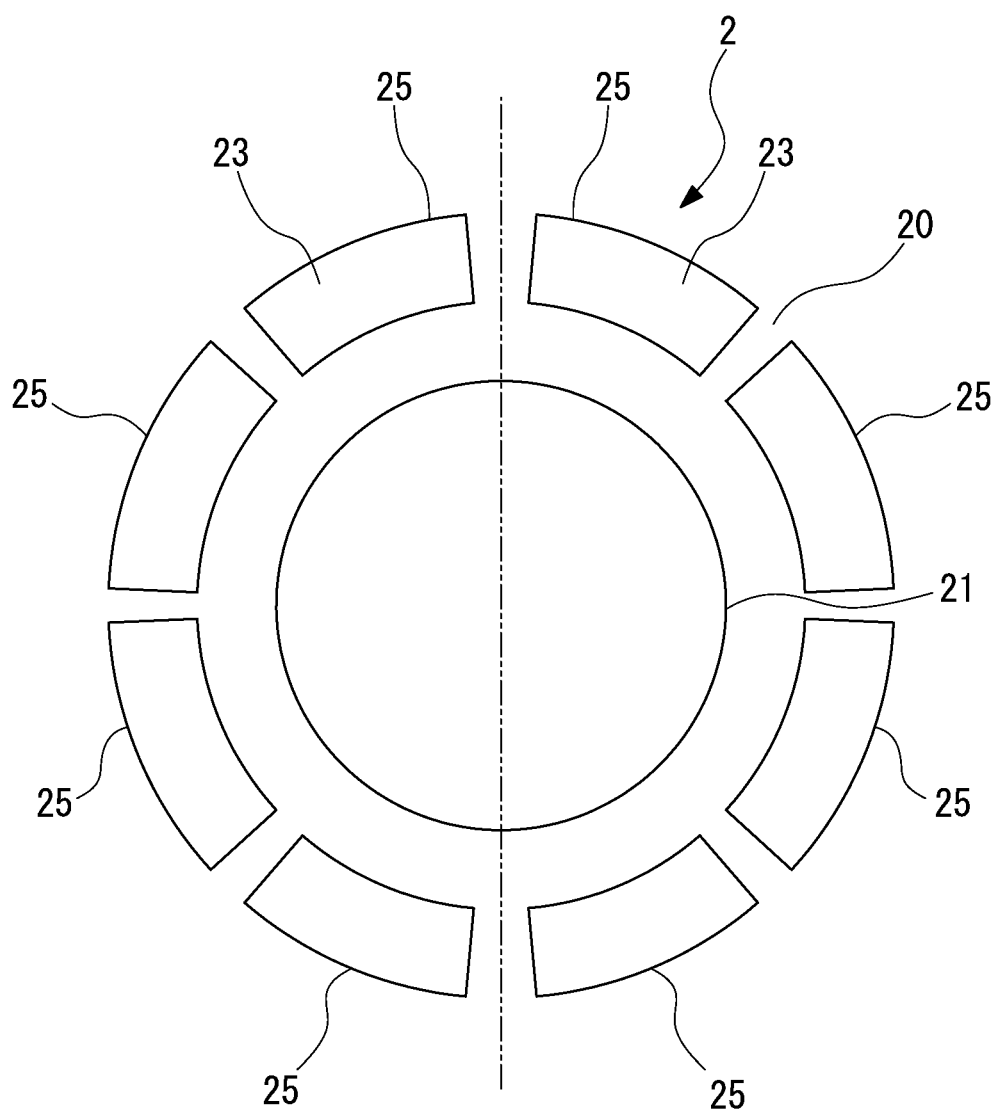
FIG. 13 is a diagram showing an example of a sensor according to a modified example of the embodiment of the present disclosure.

Although three sensor pairs 25 are provided in the above-described embodiment, the present disclosure is not limited thereto. For example, as in the sensor 2 shown in FIG. 13, four sensor pairs 25 (a total of eight temperature sensors 23) may be provided.

<Appendixes>

The fluid sensor systems 1A and 1B, the computing devices 3A and 3B, and the flow direction estimation methods S100A and 100B according to the embodiments are ascertained, for example, as follows.

(1) According to a first aspect, the fluid sensor system 1A or 1B includes the sensor 2 arranged on the flow path forming surface 10f that forms the flow path 10 of a fluid; and the computing device 3A or 3B configured to estimate the flow direction Df of the fluid in the flow path 10 on the basis of an output from the sensor 2, wherein the sensor 2 includes the heating element 21 arranged on the flow path forming surface 10f and configured to generate heat according to electric power supplied from the external power supply 24; and the outer peripheral sensor unit 22 including three or more sensor pairs 25 provided at intervals in the circumferential direction Dc to surround the heating element 21, the sensor pair 25 including two temperature sensors 23 configured to sandwich the heating element 21 and arranged opposite each other, and wherein the computing device 3A or 3B includes the first identification unit 33 configured to identify a sensor pair 25 in which an output difference between an output value corresponding to a temperature detected by one temperature sensor 23 of the sensor pair and an output value corresponding to a temperature detected by the other temperature sensor 23 of the sensor pair 25 is largest among the three or more sensor pairs 25; the second identification unit 34 configured to identify other sensor pairs 25 adjacent to the identified sensor pair 25 in the circumferential direction Dc; and the flow direction estimation unit 35A or 35B configured to estimate the flow direction Df of the fluid on the basis of the output difference in the sensor pair 25 having the largest output difference and output differences in the other sensor pairs 25 adjacent to the sensor pair in the circumferential direction Dc.

In the fluid sensor systems 1A and 1B, three or more sensor pairs 25 are arranged around the heating element 21. The sensor pairs 25 are configured to sandwich the heating element 21 and arranged facing each other.

The upstream side of the flow direction Df of the fluid is less affected by the heat generated by the heating element 21, whereas the fluid temperature increases due to an influence of the heat generated by the heating element 21 at the downstream side of the flow direction Df. Thus, when the array direction of the sensor pair 25 including the two temperature sensors 23 follows the flow direction Df of the fluid, an output difference between the output value corresponding to the temperature detected by the temperature sensor 23 located at the upstream side of the flow direction Df and the output value corresponding to the temperature detected by the temperature sensor 23 located at the downstream side of the flow direction Df increases. On the other hand, when the array direction of the sensor pair 25 including the two temperature sensors 23 obliquely intersects the flow direction Df of the fluid, an output difference between the output value corresponding to the temperature detected by the temperature sensor 23 located at the upstream side of the flow direction Df and the output value corresponding to the temperature detected by the temperature sensor 23 located at the downstream side of the flow direction Df decreases.

In the first identification unit 33 of the computing devices 3A and 3B, a sensor pair 25 in which an output difference between the output value corresponding to the temperature detected by one temperature sensor 23 of the sensor pair 25 and the output value corresponding to the temperature detected by the other temperature sensor 23 of the sensor pair 25 is largest is identified from among three or more sensor pairs 25. Thereby, it can be seen that the flow direction Df of the fluid is close to the direction in which the two temperature sensors 23 of the sensor pair 25 having the largest output difference are arranged in the circumferential direction Dc centered on the heating element 21.

Further, in the second identification unit 34 of the computing device 3A or 3B, the other sensor pairs 25 adjacent to the sensor pair 25 identified to have the largest output difference in the circumferential direction Dc are identified. Further, it is possible to estimate the inclination angle θ of the flow direction Df of the fluid to an array direction of the sensor pair 25 having the largest output difference on the basis of the output difference in the sensor pair 25 having the largest output difference and the output differences in the other sensor pairs 25 adjacent to the sensor pair 25 having the largest output difference in the circumferential direction Dc. In this way, the flow direction Df of the fluid can be estimated. Therefore, even in the case of installation in a limited installation space, the flow direction of the fluid can be easily and accurately detected.

(2) According to a second aspect, in the fluid sensor system 1A or 1B according to (1), the flow direction estimation unit 35A or 35B sets a direction in which the two temperature sensors 23 of the sensor pair 25 having the largest output difference are connected as the reference flow direction H of the fluid, the flow direction estimation unit 35A or 35B calculates the inclination angle θ of a flow of the fluid to the reference flow direction H on the basis of the output difference in the other sensor pair 25 adjacent to the sensor pair 25 in the circumferential direction Dc, and the flow direction estimation unit 35A or 35B estimates the flow direction of the fluid on the basis of the reference flow direction H and the inclination angle θ.

Thereby, the flow direction Df of the fluid can be easily estimated by setting a direction in which the two temperature sensors 23 of the sensor pair 25 having the largest output difference are connected as the reference flow direction H of the fluid and calculating the inclination angle θ of the flow of the fluid to the reference flow direction H on the basis of the output difference in the other sensor pair 25 adjacent in the circumferential direction Dc.

(3) According to a third aspect, in the fluid sensor system 1A according to (2), the flow direction estimation unit 35A or 35B calculates the inclination angle θ on the basis of a ratio between the output difference in the sensor pair 25 adjacent to the sensor pair 25 having the largest output difference at the one side Dc1 in the circumferential direction Dc and the output difference in the sensor pair 25 adjacent to the sensor pair having the largest output difference at the other side Dc2 in the circumferential direction Dc.

Thereby, when the actual flow direction Df of the fluid is inclined with respect to the reference flow direction H of the fluid set on the basis of the direction in which the two temperature sensors 23 of the sensor pair 25 having the largest output difference are connected, the output difference in the sensor pair 25 adjacent to the sensor pair 25 having the largest output difference at one side Dc1 in the circumferential direction Dc is different from the output difference in the sensor pair 25 adjacent to the sensor pair 25 having the largest output difference at the other side Dc2 in the circumferential direction Dc. Thereby, it is possible to calculate the inclination angle θ of the actual flow direction Df of the fluid as the inclination angle θ on the basis of a ratio between the output difference in the sensor pair 25 adjacent at the one side Dc1 in the circumferential direction Dc and the output difference in the sensor pair 25 adjacent at the other side Dc2 in the circumferential direction Dc. In this way, it is possible to easily and accurately detect the flow direction Df of the fluid.

(4) According to a fourth aspect, in the fluid sensor system 1B according to (2), the flow direction estimation unit 35A or 35B calculates the inclination angle θ by performing an approximation process with a determined periodic function using the output difference in the sensor pair 25 having the largest output difference, the output difference in the sensor pair 25 adjacent to the sensor pair 25 having the largest output difference at the one side Dc1 in the circumferential direction Dc, and the output difference in the sensor pair 25 adjacent to the sensor pair 25 having the largest output difference at the other side Dc2 in the circumferential direction Dc.

Thereby, the flow direction Df of the fluid can be easily and accurately detected by performing a fitting process for a periodic function using the output difference in the sensor pair 25 having the largest output difference, the output difference in the sensor pair 25 adjacent to the sensor pair 25 having the largest output difference at one side Dc1 in the circumferential direction Dc, and the output difference in the sensor pair 25 adjacent to the sensor pair 25 having the largest output difference at the other side Dc2 in the circumferential direction Dc.

(5) According to a fifth aspect, in the fluid sensor system 1A or 1B according to any one of (1) to (4), when the first identification unit 33 has identified two sensor pairs in which output differences are largest, the flow direction estimation unit 35A or 35B estimates an intermediate direction between a direction in which the temperature sensors 23 of one sensor pair 25 between the two sensor pairs 25 that have been identified are connected and a direction in which the temperature sensors 23 of the other sensor pair 25 are connected as the flow direction Df of the fluid.

Thereby, when two sensor pairs 25 having the largest output difference are identified, it is possible to easily and accurately detect the flow direction Df of the fluid by estimating an intermediate direction between the direction in which the temperature sensors 23 of one sensor pair 25 between the two sensor pairs 25 that have been identified are connected and the direction in which the temperature sensors 23 of the other sensor pair 25 are connected as the flow direction Df of the fluid.

(6) According to a sixth aspect, the computing device 3A or 3B for estimating the flow direction Df of a fluid in the flow path 10 on the basis of an output from a sensor 2 including the heating element 21 arranged on the flow path forming surface 10f that forms the flow path 10 of the fluid and configured to generate heat according to electric power supplied from the external power supply 24 and the outer peripheral sensor unit 22 including three or more sensor pairs 25 provided at intervals in the circumferential direction Dc to surround the heating element 21, the sensor pair 25 including two temperature sensors 23 configured to sandwich the heating element 21 and arranged opposite each other, includes the first identification unit 33 configured to identify a sensor pair 25 in which an output difference between an output value corresponding to a temperature detected by one temperature sensor 23 of the sensor pair and an output value corresponding to a temperature detected by the other temperature sensor 23 of the sensor pair 25 is largest among the three or more sensor pairs 25; the second identification unit 34 configured to identify other sensor pairs 25 adjacent to the identified sensor pair 25 in the circumferential direction Dc; and the flow direction estimation unit 35A or 35B configured to estimate the flow direction Df of the fluid on the basis of the output difference in the sensor pair 25 having the largest output difference and output differences in the other sensor pairs 25 adjacent to the sensor pair in the circumferential direction Dc.

Thereby, a sensor pair 25 in which an output difference between the output value corresponding to the temperature detected by one temperature sensor 23 of the sensor pair 25 and the output value corresponding to the temperature detected by the other temperature sensor 23 of the sensor pair 25 is largest is identified from among three or more sensor pairs 25. Thereby, it can be seen that the flow direction Df of the fluid overlaps a portion where the two temperature sensors 23 of the sensor pair having the largest output difference are arranged in the circumferential direction Dc centered on the heating element 21.

Further, in the second identification unit 34 of the computing device 3A or 3B, the other sensor pairs 25 adjacent to the sensor pair 25 identified to have the largest output difference in the circumferential direction Dc are identified. Further, it is possible to estimate the inclination angle $\theta$ of the flow direction Df of the fluid to an array direction of the sensor pair 25 having the largest output difference on the basis of the output difference in the sensor pair 25 having the largest output difference and the output differences in the other sensor pairs 25 adjacent to the sensor pair 25 having the largest output difference in the circumferential direction Dc. In this way, the flow direction Df of the fluid can be estimated. Therefore, even in the case of installation in a limited installation space, the flow direction of the fluid can be easily and accurately detected.

(7) According to a seventh aspect, the flow direction estimation method S100A or S100B of estimating the flow direction Df of a fluid in the flow path 10 on the basis of an output from a sensor 2 including the heating element 21 arranged on the flow path forming surface 10f that forms the flow path 10 of the fluid and configured to generate heat according to electric power supplied from the external power supply 24 and the outer peripheral sensor unit 22 including three or more sensor pairs 25 provided at intervals in the circumferential direction Dc to surround the heating element 21, the sensor pair 25 including two temperature sensors 23 configured to sandwich the heating element 21 and arranged opposite each other, includes step S112 of identifying a sensor pair 25 in which an output difference between an output value corresponding to a temperature detected by one temperature sensor 23 of the sensor pair 25 and an output value corresponding to a temperature detected by the other temperature sensor 23 of the sensor pair 25 is largest among the three or more sensor pairs 25; step S121 of identifying other sensor pairs 25 adjacent to the identified sensor pair 25 in the circumferential direction Dc; and step S123 of estimating the flow direction Df of the fluid on the basis of the output difference in the sensor pair 25 having the largest output difference and output differences in the other sensor pairs 25 adjacent to the sensor pair in the circumferential direction Dc.

Thereby, a sensor pair 25 in which an output difference between the output value corresponding to the temperature detected by one temperature sensor 23 of the sensor pair 25 and the output value corresponding to the temperature detected by the other temperature sensor 23 of the sensor pair 25 is largest is identified from among three or more sensor pairs 25. Thereby, it can be seen that the flow direction Df of the fluid overlaps a portion where the two temperature sensors 23 of the sensor pair having the largest output difference are arranged in the circumferential direction Dc centered on the heating element 21.

Further, the other sensor pairs 25 adjacent to the sensor pair 25 identified to have the largest output difference in the circumferential direction Dc are identified. Further, it is possible to estimate the inclination angle $\theta$ of the flow direction Df of the fluid to an array direction of the sensor pair 25 having the largest output difference on the basis of the output difference in the sensor pair 25 having the largest output difference and the output differences in the other sensor pairs 25 adjacent to the sensor pair 25 having the largest output difference in the circumferential direction Dc. In this way, the flow direction Df of the fluid can be estimated. Therefore, even in the case of installation in a limited installation space, the flow direction of the fluid can be easily and accurately detected.

1A, 1B Fluid sensor system
2 Sensor
2f Sensor surface
3A, 3B Computing device
10 Flow path
10f Flow path forming surface
11 Concave portion
20 Sensor substrate
21 Heating element
21r Semicircular arc-shaped pattern
21j Connection pattern
21t Terminal pattern
22 Outer peripheral sensor unit
23 Temperature sensor
23p Sensor pattern
23t Terminal pattern
24 External power supply
25 Sensor pair
25A First sensor pair
25B Second sensor pair
25C Third sensor pair
31 Signal input unit
32 Output difference calculation unit
33 First identification unit
34 Second identification unit
35A, 35B Flow direction estimation unit
36 Output unit
61 CPU
62 ROM
63 RAM
64 HDD
65 Signal transmission/reception module
231a, 231b, 232a, 232b, 233a, 233b Temperature sensor
C1-C4 Center
CL1, CL2, CL3 Direction
Dc Circumferential direction
Dc1 One Side
Dc2 Other side
Df Direction
$\Delta E, \Delta E1, \Delta E2, \Delta E3$ Output difference
$\alpha$ Phase angle
$\theta$ Inclination angle

The invention claimed is:

1. A fluid sensor system comprising:
a sensor arranged on a flow path forming surface that forms a flow path of a fluid; and
a controller configured to estimate a flow direction of the fluid in the flow path on the basis of an output from the sensor,
wherein the sensor includes
a heating element arranged on the flow path forming surface and configured to generate heat according to electric power supplied from an external power supply; and
an outer peripheral sensor unit including three or more sensor pairs provided at intervals in a circumferential direction to surround the heating element, each sensor pair of the three or more sensor parts including two temperature sensors configured to sandwich the heating element and arranged opposite each other, and wherein the controller is configured to:
identify a sensor pair in which an output difference between an output value corresponding to a temperature detected by one temperature sensor of the sensor pair and an output value corresponding to a temperature detected by the other temperature sensor of the sensor pair is largest among the three or more sensor pairs;
identify other sensor pairs adjacent to the identified sensor pair in the circumferential direction; and
estimate the flow direction of the fluid on the basis of the output difference in the sensor pair having the largest output difference and output differences in the other sensor pairs adjacent to the sensor pair in the circumferential direction.

2. The fluid sensor system according to claim 1, wherein the controller is further configured to
set a direction in which the two temperature sensors of the sensor pair having the largest output difference are connected as a reference flow direction of the fluid,
calculate an inclination angle of a flow of the fluid to the reference flow direction on the basis of the output differences in the other sensor pairs adjacent to the sensor pair in the circumferential direction, and
estimate the flow direction of the fluid on the basis of the reference flow direction and the inclination angle.

3. The fluid sensor system according to claim 2, wherein the controller is further configured to calculate the inclination angle on the basis of a ratio between the output difference in the sensor pair adjacent to the sensor pair having the largest output difference at a first side in the circumferential direction and the output difference in the sensor pair adjacent to the sensor pair having the largest output difference at a second side in the circumferential direction.

4. The fluid sensor system according to claim 2, wherein the controller is further configured to calculate the inclination angle by performing an approximation process with a determined periodic function using the output difference in the sensor pair having the largest output difference, the output difference in the sensor pair adjacent to the sensor pair having the largest output difference at a first side in the circumferential direction, and the output difference in the sensor pair adjacent to the sensor pair having the largest output difference at a second side in the circumferential direction.

5. The fluid sensor system according to claim 1, wherein, when the controller has identified two sensor pairs in which output differences are largest, the controller is configured to estimate an intermediate direction between a direction in which the temperature sensors of one sensor pair between the two sensor pairs that have been identified are connected and a direction in which the temperature sensors of the other sensor pair are connected as the flow direction of the fluid.

6. A controller for estimating a flow direction of a fluid in a flow path on the basis of an output from a sensor including a heating element arranged on a flow path forming surface that forms the flow path of the fluid and configured to generate heat according to electric power supplied from an external power supply and an outer peripheral sensor unit including three or more sensor pairs provided at intervals in a circumferential direction to surround the heating element, each sensor pair of the three or more sensor pairs including two temperature sensors configured to sandwich the heating element and arranged opposite each other, wherein the controller is configured to:
identify a sensor pair in which an output difference between an output value corresponding to a temperature detected by one temperature sensor of the sensor pair and an output value corresponding to a temperature detected by the other temperature sensor of the sensor pair is largest among the three or more sensor pairs;
identify other sensor pairs adjacent to the identified sensor pair in the circumferential direction; and
estimate the flow direction of the fluid on the basis of the output difference in the sensor pair having the largest output difference and output differences in the other sensor pairs adjacent to the sensor pair in the circumferential direction.

7. A flow direction estimation method of estimating a flow direction of a fluid in a flow path on the basis of an output from a sensor including a heating element arranged on a flow path forming surface that forms the flow path of the fluid and configured to generate heat according to electric power supplied from an external power supply and an outer peripheral sensor unit including three or more sensor pairs provided at intervals in a circumferential direction to surround the heating element, each sensor pair of the three or more sensor pairs including two temperature sensors configured to sandwich the heating element and arranged opposite each other, the flow direction estimation method comprising steps of:
identifying the sensor pair in which an output difference between an output value corresponding to a temperature detected by one temperature sensor of the sensor pair and an output value corresponding to a temperature detected by the other temperature sensor of the sensor pair is largest among the three or more sensor pairs;
identifying other sensor pairs adjacent to the identified sensor pair in the circumferential direction; and
estimating the flow direction of the fluid on the basis of the output difference in the sensor pair having the largest output difference and output differences in the other sensor pairs adjacent to the sensor pair in the circumferential direction.

* * * * *